(12) United States Patent
Anzawa et al.

(10) Patent No.: US 7,400,114 B2
(45) Date of Patent: Jul. 15, 2008

(54) VOLTAGE EQUALIZER FOR BATTERY ELEMENTS

(75) Inventors: Seiichi Anzawa, Tokyo (JP); Katsumi Kobayashi, Nagano (JP)

(73) Assignees: Fuji Jukogyo Kabushiki Kaisha, Tokyo (JP); Nagano Japan Radio Co., Ltd., Nagano (JP)

( * ) Notice: Subject to any disclaimer, the term of this patent is extended or adjusted under 35 U.S.C. 154(b) by 300 days.

(21) Appl. No.: 11/021,018

(22) Filed: Dec. 22, 2004

(65) Prior Publication Data

US 2005/0140336 A1 Jun. 30, 2005

(30) Foreign Application Priority Data

Dec. 26, 2003 (JP) ............................. 2003-435418
Mar. 30, 2004 (JP) ............................. 2004-101118

(51) Int. Cl.
*H02J 7/00* (2006.01)

(52) U.S. Cl. ...................................... 320/119; 320/118

(58) Field of Classification Search ................ 320/106, 320/107, 112, 116, 118, 119, 120, 121, 152, 320/157, 117, 130, 132, 134, 135, 136; 324/433, 324/434, 435, 537, 547; 307/17, 37, 38, 307/43, 83
See application file for complete search history.

(56) References Cited

U.S. PATENT DOCUMENTS

| | | | | |
|---|---|---|---|---|
| 3,711,747 A | * | 1/1973 | Sahara et al. | 361/41 |
| 3,897,591 A | * | 7/1975 | Lundstrom et al. | 380/253 |
| 4,079,303 A | * | 3/1978 | Cox | 320/119 |
| 4,210,779 A | * | 7/1980 | Simokat | 370/488 |
| 4,331,911 A | * | 5/1982 | Park | 320/119 |
| 4,555,754 A | * | 11/1985 | Hennevin | 363/132 |
| 5,003,244 A | * | 3/1991 | Davis, Jr. | 320/119 |
| 5,424,932 A | * | 6/1995 | Inou et al. | 363/21.06 |
| 5,570,276 A | * | 10/1996 | Cuk et al. | 363/16 |
| 5,659,237 A | * | 8/1997 | Divan et al. | 320/119 |
| 5,666,041 A | * | 9/1997 | Stuart et al. | 320/116 |
| 5,767,660 A | * | 6/1998 | Schmidt | 320/140 |
| 5,982,143 A | * | 11/1999 | Stuart | 320/119 |
| 6,222,344 B1 | | 4/2001 | Peterson et al. | |

(Continued)

FOREIGN PATENT DOCUMENTS

| | | |
|---|---|---|
| DE | 10157003 | 5/2002 |
| JP | 2002-223528 | 8/2002 |
| JP | 2002-357625 | 12/2002 |

OTHER PUBLICATIONS

European Search Report for European Application No. 04 03 0303, Mailed Jun. 29, 2007, 3 pages.

*Primary Examiner*—Adolf Berhane
*Assistant Examiner*—M'Baye Diao
(74) *Attorney, Agent, or Firm*—Osha Liang LLP

(57) ABSTRACT

A voltage equalizer for battery elements for equalizing terminal voltages of a plurality of battery elements comprises an equalization processing circuit. The equalization processing circuit includes a transformer having basic windings. The basic windings comprise a plurality of primary windings corresponding to the plurality of battery elements and one or more secondary windings, a plurality of switching elements corresponding to the battery elements, a plurality of primary diodes corresponding to the battery elements, and one or more secondary diodes corresponding to the secondary windings. In the voltage equalizer, primary series circuits for carrying current from the battery elements via the corresponding primary diodes to the primary windings and secondary series circuits for carrying current from the secondary windings via the secondary diodes to the battery elements are formed.

24 Claims, 15 Drawing Sheets

U.S. PATENT DOCUMENTS

| | | | |
|---|---|---|---|
| 6,373,223 B1 * | 4/2002 | Anzawa et al. | 320/118 |
| 6,373,726 B1 * | 4/2002 | Russell | 363/21.14 |
| 6,586,910 B2 * | 7/2003 | Matsui et al. | 320/122 |
| 6,642,693 B2 * | 11/2003 | Anzawa et al. | 320/119 |
| 6,801,014 B1 * | 10/2004 | Chitsazan et al. | 320/119 |
| 2002/0074985 A1 * | 6/2002 | Matsui et al. | 323/355 |
| 2002/0109482 A1 * | 8/2002 | Anzawa et al. | 320/119 |
| 2006/0119319 A1 * | 6/2006 | Sakurai et al. | 320/116 |

* cited by examiner

|  | EXPERIMENTAL RESULT No.1 | | EXPERIMENTAL RESULT No.2 | |
| --- | --- | --- | --- | --- |
|  | Vo [V] | ERROR [V] | Vo [V] | ERROR [V] |
| BATTERY ELEMENT No.1 | 2.003 |  | 2.063 |  |
| BATTERY ELEMENT No.2 | 3.421 |  | 2.063 |  |
| BATTERY ELEMENT No.3 | 3.421 |  | 2.063 |  |
| BATTERY ELEMENT No.4 | 3.414 |  | 2.062 |  |
| BATTERY ELEMENT No.5 | 3.408 |  | 3.941 |  |
| BATTERY ELEMENT No.6 | 3.428 |  | 3.945 |  |
| BATTERY ELEMENT No.7 | 3.428 |  | 3.946 |  |
| BATTERY ELEMENT No.8 | 4.032 |  | 3.946 |  |
| Vmin | 2.034 | 0.031 | 2.046 | -0.016 |
| Vmax | 3.970 | -0.062 | 3.943 | -0.003 |

VOLTAGE EQUALIZER FOR BATTERY ELEMENTS

This application claims foreign priorities based on Japanese patent applications No. JP-2003-435418 filed on Dec. 26, 2003 and No, JP-2004-101118 files on Mar. 30, 2004, the contents of which is incorporated herein by reference.

BACKGROUND OF THE INVENTION

The present invention relates to a voltage equalizer for battery elements for equalizing terminal voltages of battery elements which constitute a battery or the like.

In general, a battery including a number of (for example, about one hundred) battery elements which are connected in series to each other is installed in an electric vehicle which is run by a motor or a hybrid vehicle which is run in combination of an engine and a motor. Then, a voltage equalizer is connected to the battery in consideration of securement of a charging capacity, extension of the life of each battery element and safety. Further, a voltage detector for detecting an abnormal terminal voltage of each battery element is also connected to the battery to eliminate a risk of the occurrence of a serious secondary failure which would be caused by heat and leakage of fluid which are caused in the event that there occurs a short circuit in one of the battery elements.

Conventionally, as a voltage equalizer of this type, a voltage equalizer for battery elements is known which was proposed by the applicant of the present invention and is disclosed in JP-A-2002-223528. In this voltage equalizer, a closed circuit is configured by battery elements of one of a plurality of groups of battery elements which are connected in series, each of a plurality of secondary windings which are magnetically connected to each other and each of one of pluralities of switching elements, and a closed circuit is configured by battery elements of the other group of battery elements, primary windings which are magnetically connected to the secondary windings in a common fashion and the other plurality of switching elements, whereby the output voltage of the one of a plurality of groups of battery elements which are connected in series is equalized by ON/OFF controlling the one of pluralities of switching elements and the other plurality of switching elements alternately.

In addition, as the voltage detector, a voltage detection circuit for battery elements is known which has already been proposed by the applicant of the present invention and is disclosed in JP-2002-357625. This voltage detection circuit is a voltage detection circuit for battery elements for detecting a voltage between terminals of each of a plurality of battery elements which are connected in series to each other which has a voltage detection means connected between terminals of each of the plurality of battery elements and adapted to cause a detection current to flow from an output terminal when a predetermined voltage is reached and a single detection signal output means connected via a load resistance to a negative terminal of a battery element, which is positioned on a minimum potential side, of the plurality of battery elements which are connected in series to the output terminal of the voltage detecting means, whereby a sufficient current for the single detection signal output means to output a detection signal can securely be allowed to flow even in the event that any of the battery elements reaches a predetermined voltage which is set in advance.

In the afore said conventional voltage equalizer (and the voltage detector), however, there exist the following problems to be solved.

As a first problem, when paying attention to the voltage equalizer, since energy is temporarily stored in the transformer and thereafter, a substantial equalization process is carried out, there still remains a room for improvement from equalization capability and equalization efficiency (equalization time) perspectives. In addition, since an equalization process is performed between all of the battery elements, respectively, there exists a risk that excessive charging and discharging currents are generated in case terminal voltages between the battery elements vary largely.

As a second problem, in a case where the voltage detector is connected in addition to the voltage equalizer, since they constitute two dedicated devices which are independent from each other, a configuration is generated in which the two dedicated devices are combined with the battery elements, and this calls for increase in cost, enhancement of energy loss and enlargement of size of the entire system.

As a third problem, when paying attention to the voltage detector, since the terminal voltage of each battery element is detected through an independent detection circuit, a number of detection circuits which corresponds to the number of battery elements are required, and in case the number of battery elements is increased, this calls for an increase in components cost in conjunction with a remarkable increase in the number of components and an increase in production costs in association with the complexity of circuits. In addition, the size of the system is also increased, and this constitutes a cause for the prevention of the effort to save space in an electric vehicle where components layout space is limited, and wasteful energy loss is also increased.

SUMMARY OF THE INVENTION

The invention was made in view of these situations, and an object thereof is to provide a voltage equalizer for battery elements which can solve the problems inherent in the background art.

With a view to solving the problems, according to the invention, there is provided a voltage equalizer for battery elements for equalizing terminal voltages of a plurality of battery elements B . . . , comprising an equalization processing circuit 6 having a transformer 2 having, in turn, basic windings 2o . . . made up of at least a plurality of primary windings 2a . . . which correspond, respectively, to the plurality of battery elements and one or two or more secondary windings 2b . . . , a plurality of switching elements 3 . . . which correspond, respectively, to the battery elements B . . . , a plurality of primary diodes 5a . . . which correspond, respectively, to the battery elements B . . . , and one or two or more secondary diodes 5b . . . which correspond, respectively, to the secondary windings 2b . . . to thereby constitute a plurality of primary series circuits Ca . . . which can carry current from the battery elements B . . . via the corresponding primary diodes 5a . . . to the primary windings 2a . . . , when the respective switching elements 3 . . . are switched on and one or two or more secondary series circuits Cb . . . which can carry current from the secondary windings 2b . . . via the secondary diodes 5b . . . to the battery elements B . . . , when the respective switching elements 3 . . . are switched off, and a control circuit 7 for ON/OFF controlling the respective switching elements 3 . . . .

By this configuration, when the respective switching elements 3 . . . are switched on in a synchronized fashion, since the plurality of primary series circuits Ca . . . are configured in which current is carried from the respective battery elements B . . . via the corresponding primary diodes 5a . . . to the respective primary windings 2a . . . , the respective primary series circuits Ca . . . are connected in parallel to each other, and in the event that the number of turns of the respective basic windings 2o . . . is identical, storage currents Is . . . flow from the battery terminals B . . . of a maximum terminal voltage Vomax to the basic windings 2o . . . in association with storage of energy into the transformer 2. On the other hand, thereafter, when the respective switching elements 3 . . . are switched off in a synchronized fashion, since the secondary series circuits Cb . . . are configured in which current is carried from the secondary windings 2b . . . via the secondary diodes 5b . . . to the battery elements B . . . , emission currents Ir . . . flow from the secondary windings 2b . . . to the battery elements B . . . of a minimum terminal voltage Vomin in association with emission of energy from the transformer 2.

In this case, according to preferred embodiments of the invention, it is desirable that the plurality of battery elements B . . . are connected in series to each other. In addition, the basic windings 2o . . . may be made up of pluralities of primary windings 2a . . . and secondary windings 2b . . . which correspond, respectively, to the battery elements B . . . by separating the primary windings and the secondary windings with intermediate taps 2oc . . . . Alternatively, the basic windings 2o . . . may be made up of a single winding to be used both for the primary series circuits Ca . . . in the corresponding battery elements B . . . and the secondary series circuits Cb . . . in the other battery elements B . . . , and an auxiliary winding 2x may be provided in the transformer 2 for use as a secondary series circuit Cb in the battery elements B where the secondary series circuit is not configured depending upon the basic windings 2o. Furthermore, the basic windings 2o . . . may be made up of a plurality of primary windings 2a . . . which correspond, respectively, to the battery elements B . . . and one or two or more secondary windings 2b . . . which correspond, respectively, to groups G of one or two or more groups which results when the plurality of battery elements B . . . are so grouped. As this occurs, the secondary windings 2b . . . may be utilized at least as part of the plurality of primary windings 2a. . . .

On one hand, the voltage equalizer 1a may include a voltage detection unit 11 for detecting a maximum terminal voltage and/or a minimum terminal voltage of the plurality (all) of battery elements B . . . from terminal voltages of the basic windings 2b or a terminal voltage of a detection winding 2d which is separately provided in the transformer 2. Note that the minimum terminal voltage Vomin may include a minimum end-to-end voltage Vxmin of end-to-end voltages of the groups G . . . of one or two or more groups which result when the plurality of battery elements B . . . are so grouped.

In addition, the voltage detection circuit 11 may include a correction circuit 13 for correcting a voltage detected from the terminal voltages of the basic windings 2o or the terminal voltage of the detection winding 2d. The voltage detection circuit 11 may include a maximum voltage holding circuit 12m for holding (storing) the maximum terminal voltage Vmax and/or a minimum voltage holding circuit 12s for holding (storing) the minimum terminal voltage Vmin. Furthermore, the voltage detection circuit 11 may include a maximum voltage detection unit 11m for detecting the maximum terminal voltage Vmax immediately after the switching elements 3 . . . are switched on. In addition, the voltage detection circuit 11 may include a minimum voltage detection unit 11s for detecting a minimum terminal voltage Vmin immediately before emission currents Ir . . . generated in association with emission of energy from the transformer 2 becomes zero after the switching elements 3 . . . are switched off. In this case, the minimum voltage detection unit 11s can detect the emission currents Ir . . . generated in association with emission of energy from the transformer 2 after the switching elements 3 . . . are switched off and then can detect the minimum terminal voltage Vmin at a timing when the magnitude of the emission currents Ir . . . so emitted has reached a predetermined threshold Irs. Note that by providing the minimum voltage detection unit 11s which is configured as has been described above, there can be provided a detection circuit 11 for detecting emission currents generated in association with emission of energy from the transformer 2 after the switching elements 3 . . . have been switched off, ON controlling the switching elements 3 . . . at a timing when a predetermined time Tr has elapsed since the emission currents Ir . . . became zero, detecting storage currents generated in association with storage of energy into the transformer 2 after the switching elements 3 . . . have been switched on, and OFF controlling the switching elements 3 . . . at a timing when the magnitude of the storage currents Is . . . has reached a predetermined value Ism. In addition, the minimum voltage detection unit 11s can obtain in advance through an operation a predetermined time Ts that is spent until the magnitude of emission currents generated in association with emission of energy from the transformer 2 decreases to a predetermined threshold Irs and can detect the minimum terminal voltage Vmin at a timing when the predetermined time Ts has elapsed after the switching elements were switched off.

On the other hand, the control circuit 7 can obtain a difference (a differential voltage Ve) between the maximum terminal voltage Vmax detected by the voltage detection circuit 11s and the minimum terminal voltage Vmin that can be compared with the maximum terminal voltage Vmax, so that the ON/OFF control of the switching elements 3 . . . is stopped so as to be put in an OFF state when the differential voltage Ve is equal to or lower than a set value Es which has been set in advance. In addition, the control circuit 7 can obtain a difference (a differential voltage Ve) between the maximum terminal voltage Vmax detected by the voltage detection circuit 11 and the minimum terminal voltage Vmin that can be compared with the maximum terminal voltage Vmax, so that a switching frequency fs for ON/OFF controlling the switching elements 3 . . . is set to be low when the differential voltage Ve is large, whereas the switching frequency fs is set to be high when the differential voltage Ve is small.

On one hand, the voltage equalizer can include an energy replenishment circuit 22 which configures a closed circuit by connecting in series a replenishment winding 2s provided in the transformer 2 for replenishment of energy, a battery unit Bs for replenishing the replenishment winding 2s with energy and a replenishment switching unit 21. In this case, assuming that a maximum terminal voltage of the battery elements is Vomax, the number of turns of the basic windings is No, the terminal voltage of the battery unit is Vs and the number of turns of the replenishment winding is Ns, Vs and/or Ns is set so as to meet a condition for (Vs/Ns)>(Vomax/No) In addition, the voltage equalizer can include a control circuit 7 for ON/OFF controlling the switching elements 3 . . . and the replenishment switching unit 21 by causing the switching elements 3 . . . and the replenishment switching unit 21 to synchronize with each other, or ON/OFF controlling the replenishment switching unit 21 with all of the switching elements 3 . . . being OFF controlled. Furthermore, the voltage equalizer can include an energy discharge circuit 26 which configures a closed circuit by connecting in series a discharge winding 2r provided in the transformer 2 for discharge of energy, a battery unit Bs adapted to be charged with energy discharged from the discharge winding 2r and a discharge switching unit 25. In this case, assuming that the minimum terminal voltage of the battery elements is Vomin, the number of turns of the basic windings is No, the terminal voltage of the battery unit is Vs, and the number of turns of the discharge winding is Nr, Vs and/or Ns is set so as to meet a condition for (Vs/Nr)<(Vomin/No). In addition, the voltage equalizer can include a control circuit 7 for ON/OFF controlling the switching elements 3 . . . and the discharge switching unit 25 by causing the switching elements and the discharge switching unit to synchronize with each other in a reverse state, or ON/OFF controlling the switching elements 3 . . . with the discharge switching unit 25 being ON controlled. Furthermore, the voltage equalizer Ig, 1h can include the equalization processing circuit 6 which is configured as a single module M, whereby a plurality of battery elements B . . . which correspond, respectively, to a plurality of modules M are connected in parallel or in series to each other.

According to the voltage equalizer 1a . . . according to the invention which is configured as has been described above, the following remarkable advantages can be provided.

(1) When the respective switching elements 3 . . . are switched on, the storage currents Is . . . flow from the battery terminals B . . . of the maximum terminal voltage Vomax to the basic windings 2o . . . in association with storage of energy into the transformer 2, whereas, when the respective switching elements 3 . . . are switched off, the emission currents Ir . . . flow from the basic windings 2o . . . to the battery elements B . . . of the minimum terminal voltage Vomin in association with emission of energy from the transformer 2, whereby the equalizing capability and the equalizing efficiency can remarkably be enhanced.

(2) Even in the event that the terminal voltages Vo . . . of the battery elements B . . . vary largely, since the emission currents Ir . . . (the storage currents Is . . . ) flow through the secondary series circuits Cb . . . (the primary series circuits Ca . . . ) individually, the generation of an adverse effect that excessive emission currents Ir . . . (storage currents Is . . . ) flow when the equalizing process is being carried out can be prevented.

(3) According to the preferred embodiment of the invention, in the event that the basic windings 2o . . . are made up of the pluralities of primary windings 2a . . . and secondary windings 2b . . . which correspond, respectively, to the battery elements B . . . by separating the primary windings and the secondary windings with the intermediate taps 2oc . . . , the basic equalization processing circuit 6 . . . can easily be configured without providing an auxiliary winding.

(4) According to the preferred embodiment of the invention, in the event that the basic windings 2o . . . are made up of the single winding to be used both for the primary series circuits Ca . . . in the corresponding battery elements B . . . and the secondary series circuits Cb . . . in the other battery elements B . . . , and the auxiliary winding 2x is provided in the transformer 2 for use as a secondary series circuit Cb in the battery elements B where the secondary series circuit is not configured depending upon the basic windings 2o, although the auxiliary winding 2x is needed, the basic windings 2o . . . can be made up of the single winding having the same number of turns as that of the primary winding 2a (or the secondary winding 2b).

(5) Furthermore, according to the preferred embodiment of the invention, in the event that the basic windings 2 . . . are made up of the plurality of primary windings 2a . . . which correspond, respectively, to the battery elements B . . . and one or two or more secondary windings 2b . . . which correspond, respectively, to groups G of one or two or more groups which results when the plurality of battery elements B . . . are so grouped, the voltage equalizer can be applied to a capacitor such as an electric double layer capacitor which produces no problem (abnormality) even in the event that the terminal voltage Vo decreases below the normal voltage, whereby the reduction in cost, size and enhancement of efficiency of the whole system can be attempted to be attained by simplifying the circuit configuration on the side of the secondary windings 2b . . . . Note that, as this occurs, the secondary windings 2b . . . can be utilized at least as part of the plurality of primary windings 2a . . . , thereby making it possible to simplify the circuit configuration further.

(6) According to the preferred embodiment of the invention, in the even that the voltage equalizer 1a includes the voltage detection unit 11 for detecting a maximum terminal voltage and/or a minimum terminal voltage of the plurality (all) of battery elements B . . . from terminal voltages of the basic windings 2b or a terminal voltage of a detection winding 2d which is separately provided in the transformer 2, the storage currents Ir . . . flow from the battery elements B . . . of the maximum terminal voltage Vomax to the basic windings 2c . . . , when the respective switching elements 3 . . . are switched on, and when the respective switching elements 3 . . . are switched off, the emission currents Ir . . . flows from the basic windings 2o . . . to the battery elements B . . . of the minimum terminal voltage Vomin. Due to this, when the respective switching elements 3 . . . are switched on, the maximum terminal voltage Vmax is generated in the basic winding 2o or the detection windig 2d, whereas when the respective switching elements 3 are switched off, the minimum terminal voltage Vmin is generated in the basic wiring 2o or the detection winding 2d. Consequently, the maximum terminal voltage Vmax and the minimum terminal voltage Vmin can easily be detected, and since the voltage detection unit 11 doubles as the substantial part of the voltage equalizer 1, the configuration of the system can be simplified. Moreover, since, as with the conventional voltage detection circuits, the necessity of the voltage detection circuits for detecting the terminal voltages Vo . . . of the respective battery elements B . . . independently can be obviated, the reduction in cost, energy loss and size of the whole system can be attempted to be attained. Note that since a main object of the voltage detection circuit 11 is to detect the battery elements B . . . whose terminal voltages Vo . . . deviate from the normal range to thereby become extraordinarily low or high, the object can be sufficiently met when only the maximum terminal voltage Vmax and the minimum terminal voltage Vmin can be detected, and therefore, there is no need to detect even normal terminal voltages Vo . . . . Consequently, the original object can be attained to a sufficient extent in the event that the voltage detection circuit 11 according to the embodiment of the invention is used which detects only the maximum terminal voltage Vmax and the minimum terminal voltage Vmin. Note that in the event that the detection winding 2d is provided separately in the transformer 2, an electrical insulation relative to the voltage equalization processing circuit 6 can be attempted, and the detection voltage can be increased or decreased as required.

(7) According to the preferred embodiment of the invention, in the event that the minimum terminal voltage . . . adopts a minimum end-to-end voltage Vxmin of end-to-end voltages of the groups G . . . of one or two or more groups which result when the plurality of battery elements B . . . are so grouped, although the terminal voltages of the respective battery elements B . . . individually, required information on whether or not a failure is occurring can be obtained, and in addition, the reduction in cost and size and enhancement of efficiency of the whole system can be attempted to be attained.

(8) According to the preferred embodiment of the invention, in the event that the voltage detection circuit 11 includes the correction circuit 13 for correcting a voltage detected from the terminal voltages of the basic windings 2o or the terminal voltage of the detection winding 2d, the maximum terminal voltage Vmax and/or minimum terminal voltage Vmin can be obtained which exclude a portion corresponding to voltage drops by the diodes 5a . . . , 5b. . .

(9) According to the preferred embodiment of the invention, in the event that the voltage detection circuit 11 includes the maximum voltage holding circuit 12m for holding (storing) the maximum terminal voltage Vmax and/or a minimum voltage holding circuit 12s for holding (storing) the minimum terminal voltage Vmin, the maximum terminal voltage Vmax that is generated when the respective switching elements 3 . . . are switched on and/or the minimum terminal voltage Vmin that is generated when the respective terminal elements 3 . . . are switched off can be detected without being affected by the ON/OFF timing of the respective switching elements 3 . . . .

(10) According to the preferred embodiment, in the event that the voltage detection circuit 11 includes the maximum voltage detection unit 11m for detecting the maximum terminal voltage Vmax immediately after the switching elements 3 . . . are switched on, although the storage currents Is . . . flow to the basic windings 2o . . . , the storage currents Is . . . increases gradually after the switching elements 3 . . . are switched on. Consequently, the switching elements 3 . . . becomes least immediately after the switching elements 3 . . . are switched on, and the voltage drop by the primary diodes 5a . . . can be ignored, an accurate maximum terminal voltage Vmax.

(11) According to the preferred embodiment, in the event the voltage detection circuit 11 includes the minimum voltage detection unit 11s for detecting a minimum terminal voltage Vmin immediately before emission currents Ir . . . generated in association with emission of energy from the transformer 2 become zero after the switching elements 3 . . . are switched off, although the emission currents Ir . . . flow to the battery elements B . . . , when the respective battery elements 3 . . . are switched off, the emission currents Ir . . . decrease gradually after the switching elements 3 . . . are switched off. Consequently, since the emission currents Ir . . . become least immediately before the emission currents become zero (immediately before the emission is completed) and the voltage drop by the secondary diodes 5b . . . can be ignored, the minimum terminal voltage Vmin can be detected accurately. In this case, the minimum voltage detection unit 11s can detect the emission currents Ir . . . generated in association with emission of energy from the transformer 2 after the switching elements 3 . . . are switched off and then can detect the minimum terminal voltage Vmin at a timing when the magnitude of the emission currents Ir . . . so emitted has reached a predetermined threshold Irs. Thus, since a constant detection timing can be obtained at all times, a minimum terminal voltage Vmin can be detected which is accurate and free from variation.

(12) According to the preferred embodiment of the invention, in the event that the control circuit 7 is provided for detecting emission currents generated in association with emission of energy from the transformer 2 after the switching elements 3 . . . have been switched off, ON controlling the switching elements 3 . . . at a timing when a predetermined time Tr has elapsed since emission currents Ir . . . became zero, detecting storage currents Is . . . generated in association with storage of energy into the transformer 2 after the switching elements 3 . . . have been switched on, and OFF controlling the switching elements 3 . . . at a timing when the magnitude of the storage currents Is . . . has reached a predetermined value Ism, a self-oscillation can be attained, whereby a separate pulse oscillator which oscillates a stationary switching freqauency (ON/OFF freqauency) fs is no more required. In addition, since the frequency is variable, an excessive current can be prevented and stable storage currents Is . . . can be caused to flow at all times. In addition, no-current time period can be eliminated, so that a voltage equalizing process can be performed efficiently.

(13) According to the preferred embodiment of the invention, in the event that the minimum voltage detection unit 11s includes the function to obtain in advance through an operation a predetermined time Ts that is spent until the magnitude of emission currents Ir . . . generated in association with emission of energy from the transformer 2 decreases to a predetermined threshold Irs and to detect the minimum terminal voltage Vmin at a timing when the predetermined time Ts has elapsed since the switching elements 3 . . . were switched off, the necessity of detection on emission currents Ir . . . can be obviated to thereby simplify the detection processing system.

(14) According to the preferred embodiment of the invention, in the event that the control circuit 7 includes a function to obtain a difference (a differential voltage Ve) between the maximum terminal voltage Vmax detected by the voltage detection circuit 11 and the minimum terminal voltage Vmin that can be compared with the maximum terminal voltage Vmax, so that the ON/OFF control of the switching elements 3 . . . is stopped so as to be put in an OFF state when the differential voltage Ve is equal to or lower than a set value Es which has been set in advance, a wasteful consumption of energy can be avoided. Namely, since a small differential voltage Ve means that the terminal voltages Vo . . . of the respective battery elements B . . . vary little, and hence there is no need to perform an equalization process, by stopping the equalization process, a wasteful consumption of energy can be avoided.

(15) According to the preferred embodiment of the invention, in the event that the control circuit 7 includes a function to obtain a difference (a differential voltage Ve) between the maximum terminal voltage Vmax detected by the voltage detection circuit 11 and the minimum terminal voltage Vmin that can be compared with the maximum terminal voltage Vmax, so that a switching frequency fs for ON/OFF controlling the switching elements 3 . . . is set to be low when the differential voltage Ve is large, whereas the switching frequency fs is set to be high when the differential voltage Ve is small, the ON time of the switching elements 3 . . . can be reduced when the differential voltage Ve is small, so that the energy stored into and emitted from the transformer 2 is reduced, whereas, when the differential voltage Ve is large, the ON time of the switching elements 3 . . . can be extended, so that the capability of equalization process can be enhanced.

(16) According to the preferred embodiment of the invention, in the event that the voltage equalizer includes the energy replenishment circuit 22 which configures a closed circuit by connecting in series the replenishment winding 2s provided in the transformer 2 for replenishment of energy, the battery unit Bs for replenishing the replenishment winding 2s with energy and the replenishment switching unit 21, so that, assuming that a maximum terminal voltage of the battery elements is Vomax, the number of turns of the basic windings is No, the terminal voltage of the battery unit is Vs and the number of turns of the replenishment winding is Ns, Vs and/or Ns is set so as to meet a condition for (Vs/Ns)>(Vomax/No) and the control circuit 7 for ON/OFF controlling the switching elements 3 . . . and the replenishment switching unit 21 by causing the switching elements 3 . . . and the replenishment switching unit 21 to synchronize with each other, or ON/OFF controlling the replenishment switching unit 21 with all of the switching elements 3 . . . being OFF controlled, the battery elements B . . . can be replenished with energy by the battery unit Bs, thereby making it possible to the occurrence of excessive self-discharge in the battery elements B . . . .

(17) According to the preferred embodiment of the invention, in the event that the voltage equalizer further includes the energy discharge circuit 26 which configures a closed circuit by connecting in series the discharge winding 2r provided in the transformer 2 for discharge of energy, the battery unit Bs adapted to be charged with energy discharged from the discharge winding 2r and the discharge switching unit 25, so that, assuming that the minimum terminal voltage of the battery elements is Vomin, the number of turns of the basic windings is No, the terminal voltage of the battery unit is Vs, and the number of turns of the discharge winding is Nr, Vs and/or Ns is set so as to meet a condition for (Vs/Nr)<(Vomin/No), and the control circuit 7 for ON/OFF controlling the switching elements 3 . . . and the discharge switching unit 25 by causing the switching elements and the discharge switching unit to synchronize with each other in a reverse state, or ON/OFF controlling the switching elements 3 . . . with the discharge switching unit 25 being ON controlled, the excessive charging of the battery elements B . . . can be avoided.

(18) According to the preferred embodiment of the invention, in the event that the voltage equalizer further includes the equalization processing circuit 6 which is configured as a single module M, whereby a plurality of battery elements B . . . which correspond, respectively, to a plurality of modules M are connected in parallel or in series to each other, by configuring the equalization processing circuit 6 as a module, for example, even in the event that the size of a transformer 2 is standardized, it is possible to deal with an arbitrary number of different battery elements B . . . in a proper fashion.

BRIEF DESCRIPTION OF THE DRAWINGS

FIG. 3 is an equivalent circuit showing a state in which switching elements of the voltage equalizer are switched on.

DESCRIPTION OF THE PREFERRED EMBODIMENT

Voltage equalizers embodying the invention will now be described by reference to the drawings.

First Embodiment

Figure 1:
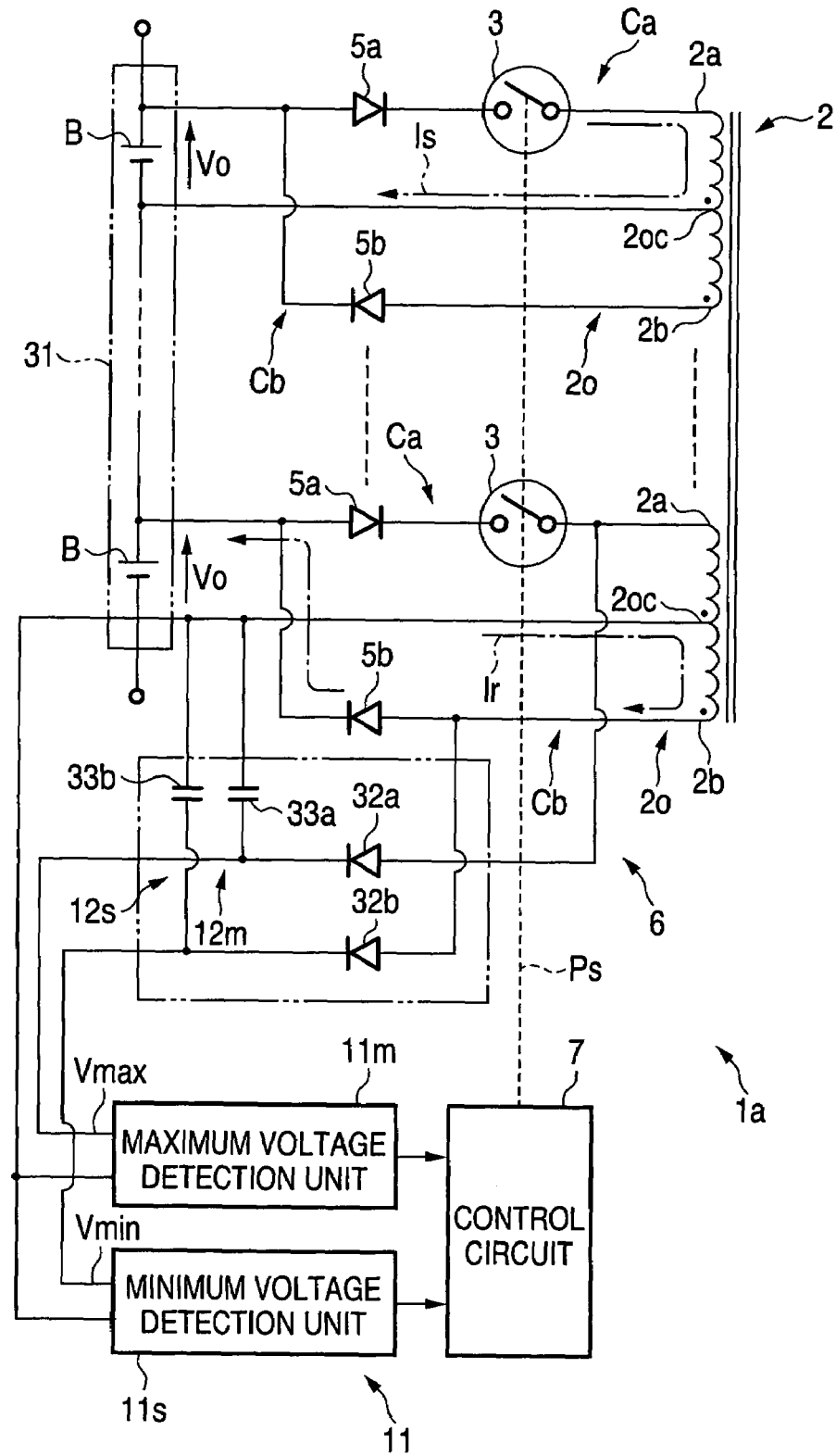
FIG. 1 is a circuit diagram of a voltage equalizer according to a first embodiment of the invention.

Firstly, referring to FIG. 1, a voltage equalizer 1a according to a first embodiment of the invention will be described, the first embodiment constituting a base mode for carrying out the invention.

In the figure, reference numeral 31 denotes a battery, in particular, a battery that is installed in electric vehicles run by motors and hybrid vehicles run by using engines in combination with motors. This battery 31 is such as to be made up of a plurality of battery elements B . . . which are connected in series, and various types of battery elements including ion batteries such as lithium ion batteries and electric double layer capacitors can be used for the battery elements B . . . In addition, each battery element B may be made up of a single cell or a plurality of cells, which are connected in series, in parallel, or in combination thereof. Then, a voltage equalizer 1a for equalizing terminal voltages Vo . . . of the respective battery elements B . . . is connected to the battery 31.

The voltage equalizer 1a includes a transformer 2 having an iron core. The transformer 2 has a plurality of basic windings 2o . . . which are provided in such a manner as to correspond, respectively, to the battery elements B . . . . In addition, each basic winding 2o has a primary winding 2a and a secondary winding 2b which are separated by a center tap (an intermediate tap) 2oc, and the center tap 2oc is connected to a negative pole side of the corresponding battery element B. In this case, numbers of turns of the respective basic windings 2 . . . are set to be the same. The primary windings 2a . . . and the secondary windings 2b . . . in the first embodiment have the same number of turns. Note that the center tap 2oc functions a winding termination terminal of the secondary winding 2b as well as a winding initiation terminal of the primary winding 2a. On the other hand, a series circuit of a switching element 3 and a primary diode (a one-way conductor element) 5a is connected between a winding termination terminal of the primary winding 2a and a positive pole side of the corresponding battery element B, and a winding initiation terminal of the secondary winding 2b is connected to the positive pole side of the corresponding battery element B via a secondary diode (a one-way conductor element) 5b, whereby a plurality of primary series circuits Ca . . . are configured in each of which current is carried from the battery element B via the corresponding primary diode 5a to the primary winding 2a (the basic winding 2o), when the switching element 3 is switched on, and a plurality of secondary series circuit Cb . . . are configured in each of which current is carried from the secondary winding 2b (the basic winding 2o) via the secondary diode 5b to the battery element B, when the switching element 3 is switched off. Consequently, the primary windings 2a . . . are used for the primary series circuits Ca . . . , and the secondary windings 2b . . . are used for the secondary series circuits Cb . . . . In addition, a semiconductor switch such as an FET is used for the switching elements 3 . . . . Thus, an equalization processing circuit 6 is configured.

On the other hand, reference numeral 7 denotes a control circuit. The control circuit 7 outputs a pulse control signal Ps which is oscillated from a pulse oscillator installed therein and whose frequency is in the order of a hundred kHz, and the respective switching elements 3 . . . are ON/OFF controlled in a synchronized fashion by this pulse control signal Ps.

Furthermore, a voltage detection circuit 11 is connected to the equalization processing circuit 6 for detecting a maximum terminal voltage Vmax and a minimum terminal voltage Vmin in the respective (all) battery elements B . . . . In this case, the voltage detection circuit 11 includes a maximum voltage detection unit 11m and a minimum voltage detection unit 11s, and a winding termination terminal of the primary winding 2a of any basic winding 2o is connected to one of input ports of the maximum voltage detection unit 11m via a diode 32, and a center tap 2oc of the relevant basic winding 2oc is connected to the other input port of the maximum voltage detection unit 11m. In addition, a winding termination terminal of the secondary winding 2b of the basic winding 2o is connected to one of input ports of the minimum voltage detection unit 11s via a diode 32b, and a center tap 2oc of the basic winding 2o is connected to the other input port of the minimum voltage detection unit 11s. Then, a voltage holding capacitor 33a is connected between an output side of the diode 32a and the center tap 2oc, and a voltage holding capacitor 33b is connected between an output side of the diode 32b and the center tap 2oc. The diode 32a and the voltage holding capacitor 33a constitute a maximum voltage holding circuit 12m for holding (storing) a maximum terminal voltage Vmax, and the diode 32b and the voltage holding capacitor 33b constitute a minimum voltage holding circuit 12s for holding (storing) a minimum terminal voltage Vmin. By providing the maximum voltage holding circuit 12m and the minimum voltage holding circuit 12s, a maximum terminal voltage Vmax that is generated when the respective switching elements 3 . . . are switched on and a minimum terminal voltage Vmin that is generated when the respective switching element 3 . . . are switched off can be detected without being affected by ON/OFF timings of the respective switching elements 3 . . . , thereby making it possible to attempt to simplify a detection processing system.

Figure 2:
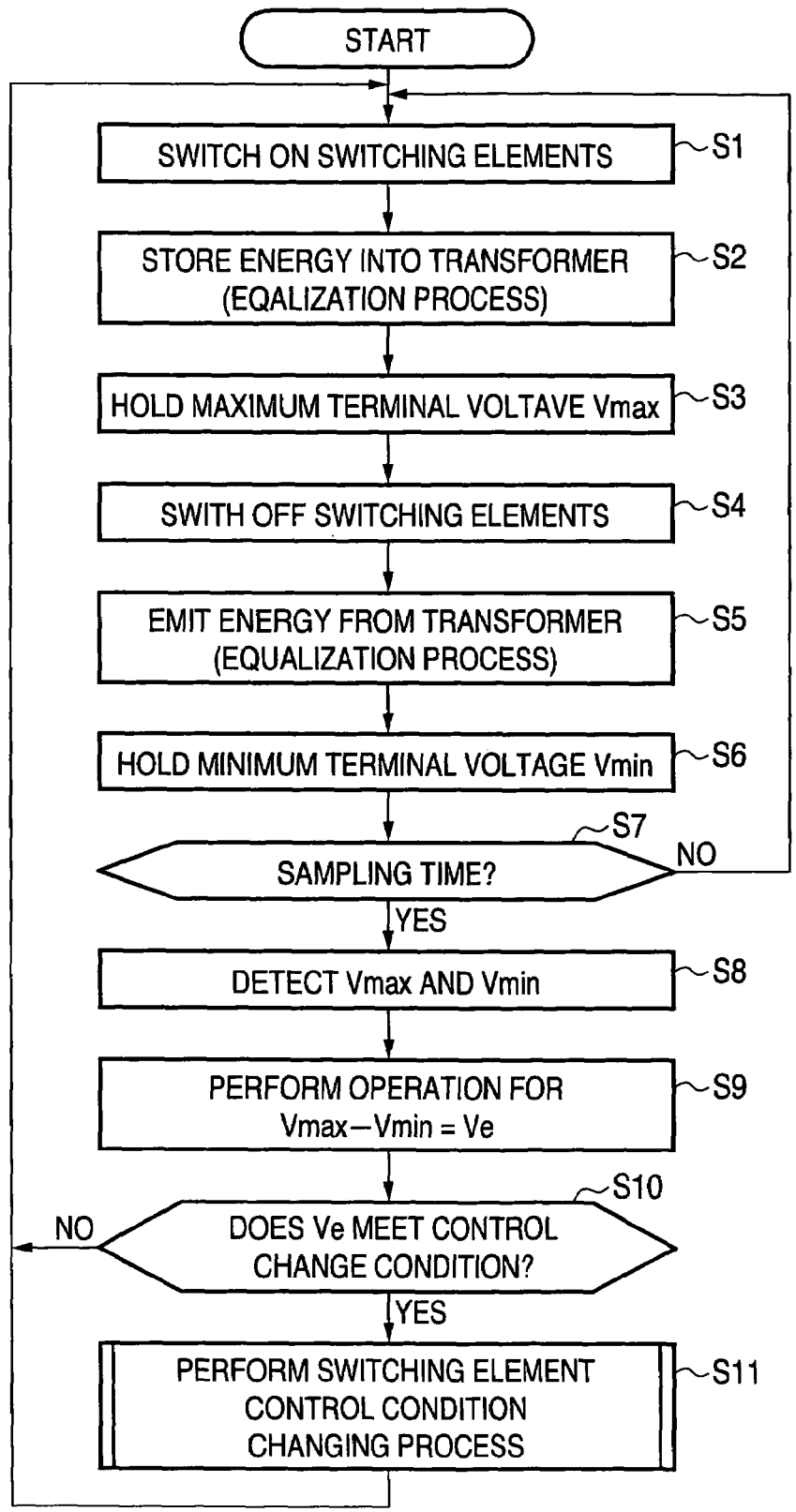
FIG. 2 is flowchart for explaining the operation of the voltage equalizer.

Next, referring FIG. 1 and FIGS. 3 to 6, the operation of the voltage equalizer 1a according to the first embodiment will be described in accordance with a flowchart shown in FIG. 2.

Firstly, when the voltage equalizer 1a is activated, pulse signals Ps are given to the respective switching elements 3 . . . by the control circuit 7, and the switching elements 3 . . . are ON/OFF controlled while being synchronized with the pulse control signals Ps so given to them. An ON/OFF condition (pulse control signal Ps) of the switching elements 3 . . . is shown in FIG. 5A.

Figure 3:
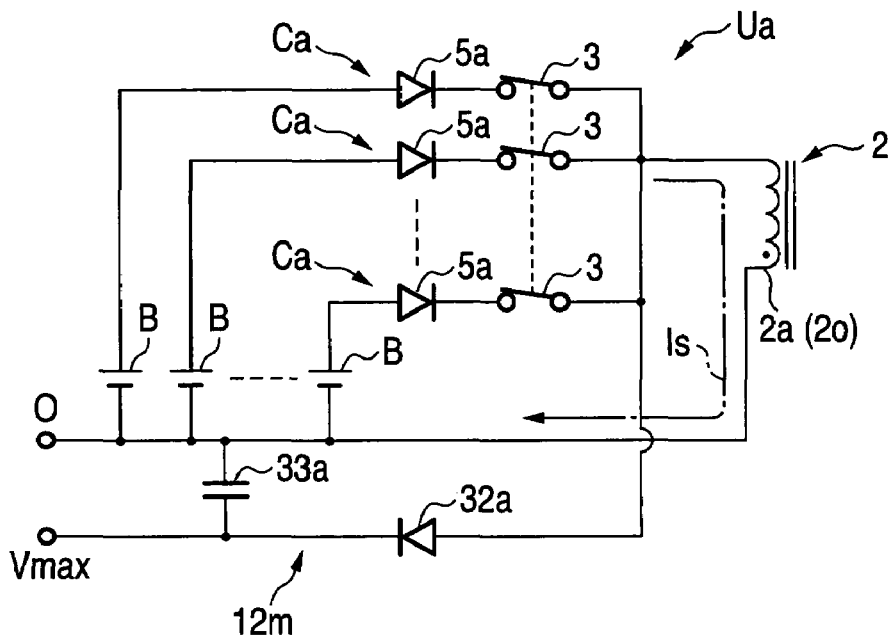

Now, assume that the respective switching elements 3 . . . are switched on (step S1). An equivalent circuit Ua of the voltage equalizer 1a when the respective switching elements 3 . . . are switched on is shown in FIG. 3. As this occurs, the plurality of primary series circuits Ca . . . are configured in each of which current is carried from the battery element B to the primary winding 2a via the corresponding diode 5a, and the respective primary circuits Ca . . . so configured are connected in parallel with each other. As a result, a storage current Is flows from the battery element B in all of the battery elements B . . . which has a largest terminal voltage Vo or the battery element B having a maximum terminal voltage Vomax to the primary winding 2a in association with storage of energy into the transformer 2, and since a maximum terminal voltage Vmax is generated in all of the primary windings 2a . . . , storage currents Is . . . do not flow from the battery elements B . . . whose terminal voltage Vo is smaller than the maximum terminal voltage Vmax. Note that there may occur a case where only one battery element B generates the maximum terminal voltage Vomax, or a case where two or more battery elements B . . . generate the maximum terminal voltage Vomax. A path along which the storage current Is flows is shown by an arrow followed by a chain line in FIG. 1. Thus, since energy is stored in the transformer 2 through the flow of the storage current Is only from the battery element B having the maximum terminal voltage Vomax, an equalization process is performed to reduce the maximum terminal voltage Vomax of the relevant battery element B (step S2).

In addition, as shown in FIG. 3, the maximum terminal voltage Vmax that is generated at both terminals (a winding initiation terminal and a winding termination terminal) of the primary winding 2a is held (stored) by the maximum voltage holding circuit 12m. Namely, the maximum terminal voltage Vmax is supplied to the voltage holding capacitor 33a via the diode 32a and is held as the terminal voltage of the voltage holding capacitor 33a (step S3). Incidentally, as shown in FIG. 5B, the storage current Is increases gradually from the point in time when the respective switching elements 3 . . . are switched on. Due to this, the terminal voltage Va of the primary winding 2a and the maximum terminal voltage Vmax which is an output from the diode 32a become as shown in FIG. 5C, and although a normal voltage corresponding to the maximum terminal voltage Vomax of the battery element B is generated immediately after the respective switching elements 3 . . . are switched on, a portion corresponding to a voltage drop in the primary diode 5a increases as the storage current Is increases, whereby the terminal voltage Va of the primary winding 2a and the maximum terminal voltage Vmax which is the output from the diode 32a also decrease gradually. Consequently, the maximum terminal voltage Vmax that is held by the maximum voltage holding circuit 12m includes an error corresponding to the voltage drop. Note that since little current flows to the diode 32a, a voltage drop by the diode 32a can be ignored.

Figure 4:
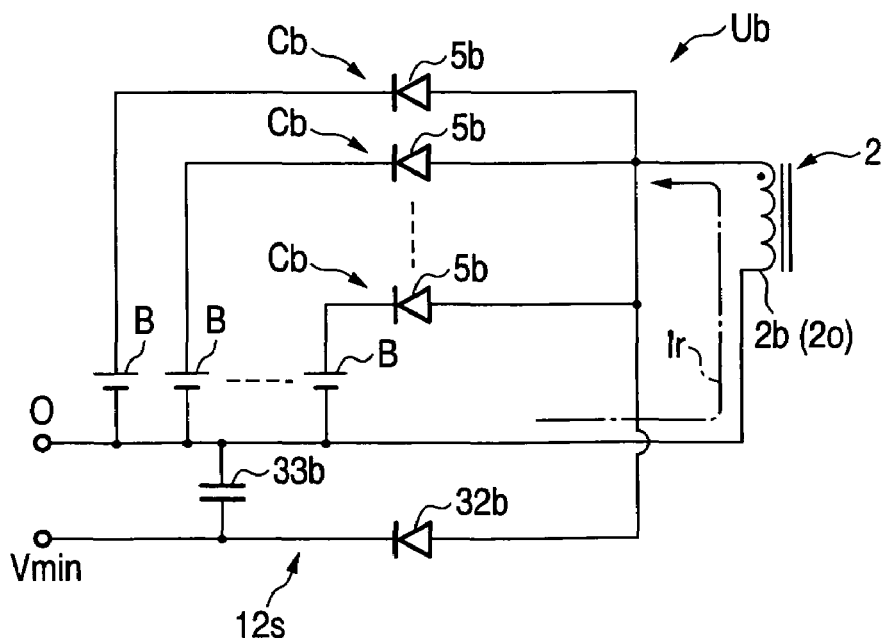
FIG. 4 is an equivalent circuit showing a state in which switching elements of the voltage equalizer are switched off.

Next, assume that the respective switching elements 3 . . . are switched off (step S4). An equivalent circuit Ub of the voltage equalizer 1a when the respective switching elements 3 . . . are switched off is shown in FIG. 4. As this occurs, the plurality of secondary series circuits Cb . . . are configured in each of which current is carried from the secondary winding 2b to the battery element B via the secondary diode 5b, and the secondary series circuits Cb . . . so configured are connected in parallel with each other. As a result, an emission current Ir flows from the secondary winding 2b to the battery element B in all of the battery elements B . . . which has a smallest terminal voltage Vo or the battery element B having a minimum terminal voltage Vomin in association with emission of energy from the transform 2, and since the minimum terminal voltage Vomin is generated in all of the secondary windings 2b . . . , emission currents Ir do not flow to the battery elements B . . . whose terminal voltage Vo is larger than the minimum terminal voltage Vomin. Note that there may occur a case where only one battery element B generates the minimum terminal voltage Vomin, or a case where two or more battery elements B . . . generate the minimum terminal voltage Vomin. A path along which the emission current Ir flows is shown by an arrow followed by a chain line in FIG. 1. Thus, since the charging of the battery element B is implemented through the flow of the emission current Ir only to the battery element B having the minimum terminal voltage Vomin, an equalization process is performed to increase the minimum terminal voltage Vomin of the relevant battery element B (step S5).

In addition, as shown in FIG. 4, the minimum terminal voltage Vimin that is generated at both terminals (a winding initiation terminal and a winding termination terminal) of the secondary winding 2b is held (stored) by the minimum voltage holding circuit 12s. Namely, the minimum terminal voltage Vmin is supplied to the voltage holding capacitor 33b via the diode 32b and is held as the terminal voltage of the voltage holding capacitor 33b (step S6). Incidentally, as shown in FIG. 5B, the emission current Ir decreases gradually from the point in time when the respective switching elements 3 . . . are switched off. Due to this, the terminal voltage Vb of the secondary winding 2b and the minimum terminal voltage Vmin which is an output from the diode 32b become as shown in FIG. 5D, and although a minimum terminal voltage Vmin to which a voltage drop in the secondary diode 5b is added to a largest extent is generated immediately after the respective switching elements 3 . . . are switched off, a portion corresponding to the voltage drop decreases as the emission current Ir decreases, whereby the terminal voltage Vb of the secondary winding 2b and the minimum terminal voltage Vmin which is the output from the diode 32b also decrease gradually. Then, a minimum terminal voltage Vmin resulting immediately before the emission currents Ir . . . generated in association with the emission of energy from the transformer 2 become zero after the switching elements 3 . . . are switched off becomes a normal voltage corresponding to the minimum terminal voltage Vomin of the battery element B. Consequently, the minimum terminal voltage Vmin held by the minimum voltage holding circuit 12s includes an error corresponding to the voltage drop. Note that since little current flows to the diode 32b, a voltage drop by the diode 32b can be ignored.

Thus, the voltage equalization process is implemented on the respective battery elements B . . . by repeating the ON/OFF operations of the switching elements 3 . . . , and in the end, the terminal voltages Vo of all the battery elements B . . . are equalized. Thus, in the equalization processing circuit 6, since, when the respective switching elements 3 . . . are switched on, the storage currents Is . . . generated in association with the storage of energy into the transformer 2 are caused to flow from the battery elements B . . . having the maximum terminal voltage Vomax to the basic windings 2o . . . , whereas, when the respective switching elements 3 . . . are switched off, the emission currents Ir . . . generated in association with the emission of energy from the transformer 2 are caused to flow from the basic windings 2o . . . to the battery elements B . . . having the minimum terminal voltage Vomin, the equalization process can be implemented both when energy is stored into the transformer 2 and when energy is emitted from the transformer 2, whereby the equalizing ability and equalizing efficiency can be enhanced remarkably. In addition, even in the event that the terminal voltages Vo . . . of the battery elements B . . . vary largely, since the emission currents Ir . . . (the storage currents Is . . . ) flow through the secondary series circuits Cb . . . (the primary series circuits Ca . . . ) individually, the generation of an adverse effect that excessive emission currents Ir . . . (storage currents Is . . . ) flow when the equalizing process is being carried out can be prevented.

On the other hand, in the voltage detection circuit 11, maximum terminal voltage Vmax and minimum terminal voltage Vmin detection processes are carried out when predetermined sampling times are reached (steps S7, S8). In this case, since the maximum terminal voltage Vmax is held in the maximum voltage holding circuit 12m (the voltage holding capacitor 33a), the maximum terminal voltage Vmax can be detected only by reading the terminal voltage of the voltage holding capacitor 33a by the maximum voltage detection unit 11m. Then, the maximum terminal voltage Vmax so detected is sent to the control circuit 7 as a datum to be stored in a memory of the control circuit 7 at least temporarily. Similarly, since the minimum terminal voltage Vmin is held in the minimum voltage holding circuit 12s (the voltage holding capacitor 33b), the minimum terminal voltage Vmin can be detected only by reading the terminal voltage of the voltage holding capacitor 33b by the minimum voltage detection unit 11s. Then, the minimum terminal voltage Vmin so detected is sent to the control circuit 7 to be stored in the memory of the control circuit 7 at least temporarily.

Thus, according to the voltage detection circuit 11, the maximum terminal voltage Vmax and the minimum terminal voltage Vmin can easily be detected, and since the voltage detection circuit 11 also functions as a substantial part of the voltage equalizer 1a, the configuration of the voltage equalizer 1a can be attempted to be simplified. Moreover, since the necessity of a conventional detection circuit for independently detecting each of the terminal voltages Vo . . . of the respective battery elements B . . . can be obviated, when thinking of the entirety of the system, the production cost can be reduced, the energy loss can be reduced, and the size can be made compact. Since a main object of the voltage detection circuit 11 is to detect the battery elements B . . . whose terminal voltages Vo . . . deviate from the normal range to thereby become extraordinarily low or high, the object can be sufficiently met when only the maximum terminal voltage Vmax and the minimum terminal voltage Vmin can be detected, and therefore, there is no need to detect even normal terminal voltages Vo . . . Consequently, the original object can be attained to a sufficient extent in the event that the voltage detection circuit 11 according to the first embodiment is used which detects only the maximum terminal voltage Vmax and the minimum terminal voltage Vmin.

In addition, since the maximum voltage holding circuit 12m and the minimum voltage holding circuit 12s are provided in the voltage detection circuit 11, the maximum terminal voltage Vmax that is generated when the respective switching elements 3 . . . are switched on and the minimum terminal voltage Vmin that is generated when the respective switching elements 3 . . . are switched off can be detected without being affected by ON/OFF timings of the respective switching elements 3 . . . In this case, while there is entrained a disadvantage that the voltage by the respective diodes 5a, 5b, 32a, 32b are contained as errors, there is provided an advantage that the detection processing system can be attempted to be simplified.

Figures 5, 6:
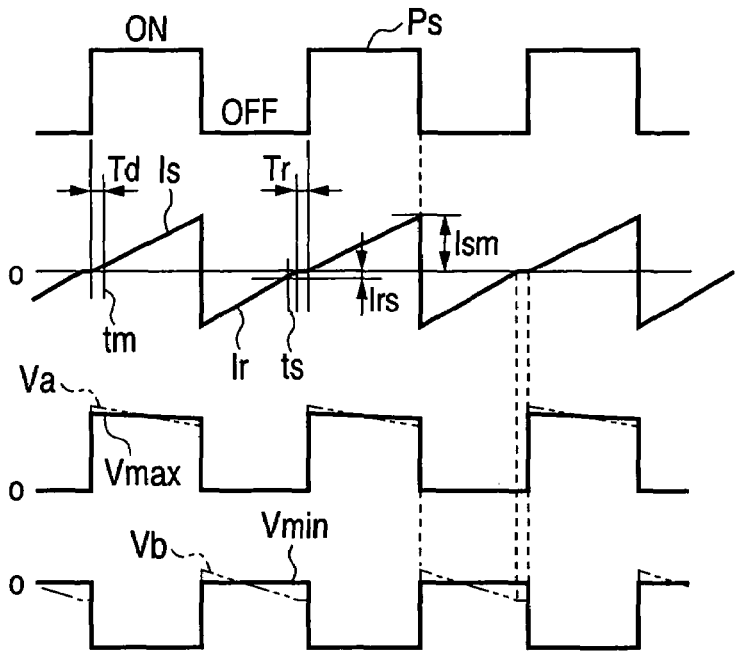
FIG. 5 is a time chart of a signal waveform in each portion of the voltage equalizer.
FIG. 6 is a table showing experimental results of a voltage detection circuit provided in the voltage equalizer.

FIG. 6 shows experimental data on maximum terminal voltages Vmax and minimum terminal voltages Vmin detected by the voltage detection circuit 11 according to the first embodiment. In experiments, a battery 31 was used in which eight battery elements B . . . are connected in series. In FIG. 6, Vo[V] represents measured data which resulted from direct measuring of terminal voltages of the respective battery elements B . . . . In addition, an experimental result No. 1 shows a sample which includes six battery elements 2 to 7 which have average terminal voltages, one battery element 1 whose terminal voltage is relatively low and one battery element 8 whose terminal voltage is relatively high, and an experimental result No. 2 shows a sample which is a combination of battery elements 1 to 4 whose terminal voltages are relatively low and battery elements 5 to 8 whose terminal voltages are relatively high.

In the experimental result No. 1, a minimum terminal voltage Vmin and a maximum terminal voltage Vmax detected by the voltage detection circuit 11 were 2.034[V] and 3.970[V], respectively. Consequently, the terminal voltage of the battery element 1 which constitutes a minimum voltage was 2.003[V], and an error therefrom was 0.031[V] (1.55[%]). In addition, the terminal voltage of the battery element 8 which constitutes a maximum voltage was 4.032[V], and an error therefrom was −0.062[V] (−1.54[%]). Furthermore, in the experimental result No. 2, a minimum terminal voltage Vmin and a maximum terminal voltage Vmax detected by the voltage detection circuit 11 were 2.046[V] and 3.943 [V], respectively. Consequently, the terminal voltage of the battery element 4 which constitutes a minimum voltage was 2.062[V], and an error therefrom was −0.016[V] (−0.78[%]). In addition, the terminal voltages of the battery elements 7, 8 which constitute a maximum voltage were 3.946[V], and an error therefrom was −0.003[V] (−0.08[%]). Thus, by using the voltage detection circuit 11, a highly accurate detection can be attained with respect to the maximum terminal voltage Vmax and the minimum terminal voltage Vmin.

On the other hand, the data as to the maximum terminal voltage Vmax and the minimum terminal voltage Vmin which are temporarily stored in the control circuit 7 are used to set a control condition for the switching elements 3 . . . . Firstly, in the control circuit 7, a difference between the maximum terminal voltage Vmax and the minimum terminal voltage Vmin (a differential voltage Ve) is obtained through an operation process of Vmax−Vmin=Ve (step S9). Then, if the differential voltage Ve so obtained is equal to or smaller than a set value Es which was set in advance, the ON/OFF control of the switching elements 3 . . . is stopped, so that the switching elements 3 . . . are in the OFF state (steps S10, S11). As this occurs, since a small differential voltage Ve means that the terminal voltages Vo . . . of the respective battery elements B . . . vary a little, needing no equalization process, a wasteful energy consumption can be avoided by stopping the equalization process. On the contrary, when the differential voltage Ve exceeds the set value Es, the terminal voltages Vo . . . of the respective battery elements B . . . vary largely, needing an equalization process, and consequently, the ON/OFF control of the switching elements 3 . . . is made to continue as it is (step S10).

In addition, when the differential voltage Ve exceeds the set value Es, a switching frequency fs for ON/OFF controlling the switching elements 3 . . . is caused to change in accordance with the magnitude of the differential voltage Ve (steps S10, S11). Namely, when the differential voltage Ve is large, a control condition changing process for setting the switching frequency fs low is performed, whereas, when the differential voltage Ve is small, a control condition changing process for setting the switching frequency fs high is performed. Thus, when the differential voltage Ve is small, the amount of energy stored in and emitted from the transformer 2 is reduced so as to reduce a wasteful loss by reducing the time when the switching elements 3 . . . are ON, whereas, when the differential voltage Ve is large, the capability of the equalization process can be increased by increasing the time when the switching elements 3 . . . are ON.

Next, voltage equalizers 1b to 1m according to modified embodiments (second to twelfth embodiments) of the invention will be described by reference to FIGS. 7 to 17.

Firstly, referring to FIGS. 7 to 13, voltage equalizers 1b to h according second to eighth embodiments of the invention will be described.

Second Embodiment

Figure 7:
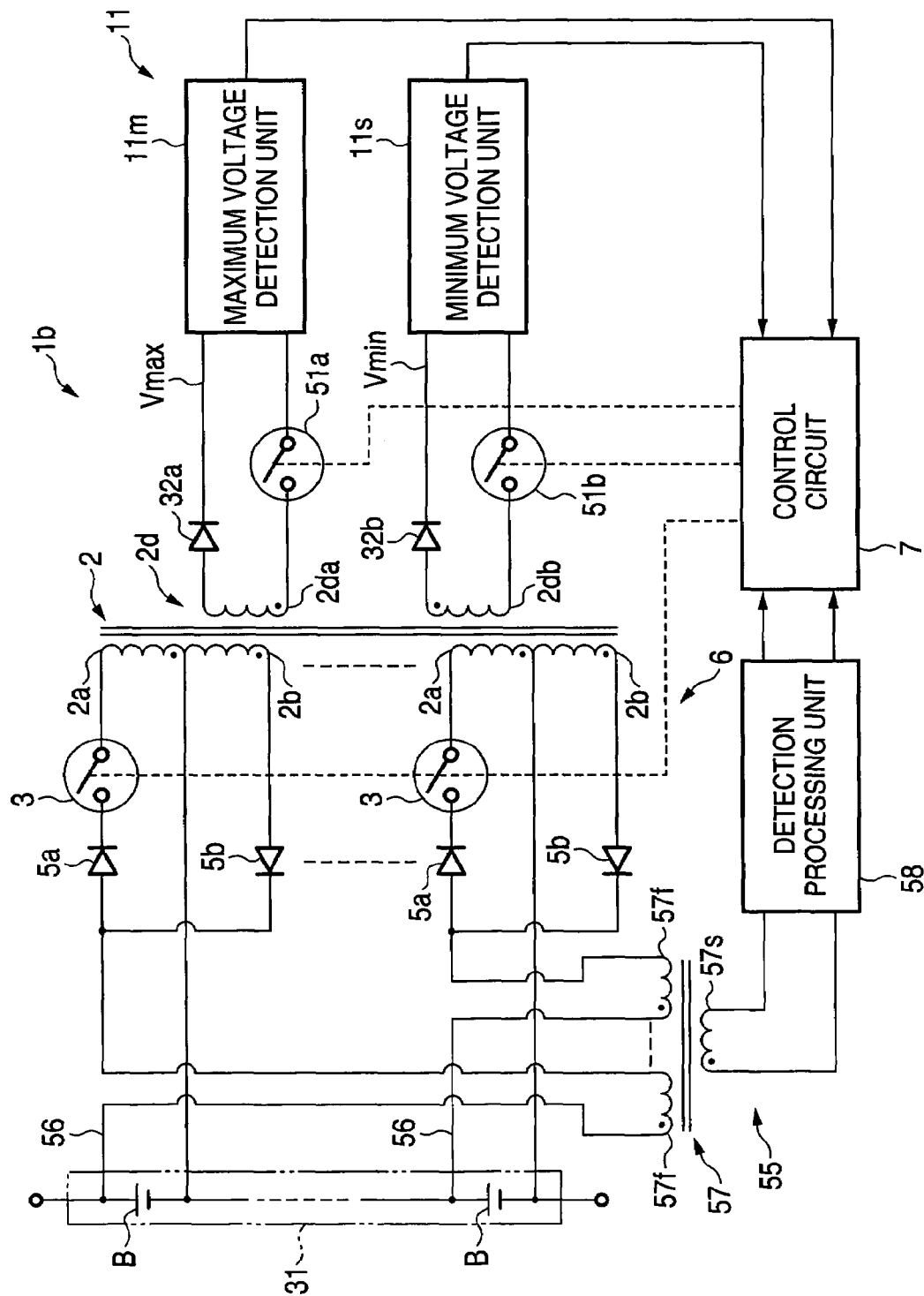
FIG. 7 is a circuit diagram of a voltage equalizer according to a second embodiment of the invention.

Initially, referring to FIG. 7, a voltage equalizer 1b according to a second embodiment will be described. With a voltage detection circuit 11 being modified, this voltage equalizer 1b differs from the voltage equalizer 1b of the first embodiment in that a maximum terminal voltage Vmax and a minimum terminal voltage Vmin are detected by a detection winding 2d which is provided separately in the transformer 2, that a detection timing is set so that a maximum terminal voltage Vmax and a minimum terminal voltage Vmin can be detected accurately, and that a pulse control signal Ps, which performs a self-oscillation and changes its frequency in accordance with the magnitudes of storage currents Is . . . and emission currents Ir . . . , is used when ON/OFF controlling the switching elements 3 . . . .

Consequently, the voltage equalizer 1b has the detection winding 2d which is provided separately in the transformer 2 and which includes a primary detection winding 2da and a secondary detection winding 2db. Since the primary detection winding 2da is used to detect a maximum terminal voltage Vmax, a winding termination terminal thereof is connected to one of input ports of a maximum voltage detection unit 11m via a diode 32a, and a winding initiation terminal thereof is connected to the other input port of the maximum voltage detection unit 11m via a switching element 51a. In addition, since the other secondary detection winding 2db is used to detect a minimum terminal voltage Vmin, a winding initiation terminal thereof is connected to one of input ports of a minimum voltage detection unit 11s via a diode 32b, and a winding termination terminal thereof is connected to the other input port of the minimum voltage detection unit 11s via a switching element 51b. In this case, in the event that the number of turns of the primary detection winding 2da is made to coincide with the number of turns of a primary winding 2a of a basic winding 2o, whereas the number of turns of the secondary detection winding 2db is made to coincide with the number of turns of a secondary winding 2b of the basic winding 2o, as done by the voltage detection circuit 11 provided in the voltage equalizer 1a of the first embodiment, a maximum terminal voltage Vmax and a minimum terminal voltage vmin can be detected. By providing the detection winding 2d, there are provided advantages that an electrical insulation relative to a voltage equalization processing circuit 6 can be attempted and that the detection voltage can be increased or decreased as required.

In addition, a current detection unit 55 is provided in the equalization processing circuit 6. The current detection unit 55 includes a detection transformer 57 having current detection windings 57f . . . which functions as a current transformer (CT) and a detection processing unit 58. The respective current detection windings 57f . . . connect in series between positive pole sides of respective battery elements B . . . and respective diodes 5a and 5b so as to detect the magnitude of emission currents Ir . . . which flow into the battery elements B . . . or storage currents Is . . . which flow out of the battery elements B . . . , and an output winding 57s of the detection transformer 57 is connected to an input side of the detection processing unit 58, an output side of the detection processing unit 58 connecting to a control circuit 7. Note that additionally, like reference numerals are imparted to like portions in FIG. 7 to those shown in FIG. 1 so as not only to make clear the configuration shown in FIG. 7 but also to omit a detailed description thereof.

The operation inherent in the voltage equalizer 1*b* according to the second embodiment will be described as below. Firstly, the ON/OFF control of the switching elements 3 . . . is not implemented by a pulse control signal Ps whose frequency is stationary but by a pulse control signal Ps whose frequency is variable in accordance with the magnitude of storage currents Is . . . and emission currents Ir . . . . This pulse signal Ps is generated as follows. Now, assume that the switching elements 3 . . . are in the OFF state. In this case, emission currents Ir . . . are detected by the current detection unit 55. Since the emission currents Ir decrease gradually as shown in FIG. 5B, the control circuit 7 monitors the magnitude of emission currents Ir . . . which are detected and starts the ON control of the switching elements 3 . . . at a timing when a predetermined time Tr, which is set in advance, has elapsed since the emission currents Ir . . . became zero. On the other hand, after the switching elements 3 . . . have been switched on, storage currents Is . . . flow, and since the storage currents Is . . . so flowing are detected by the current detection unit 55 and gradually decrease as shown in FIG. 5B, the control circuit 7 monitors the magnitude of the storage currents Is . . . so detected and starts the OFF control of the switching elements 3 . . . at a timing when the storage currents Is . . . have reached a predetermined value Ism.

Thereby, the control circuit 7 starts self-oscillation, and therefore, a separate oscillator which oscillates a stationary switching frequency (ON/OFF frequency) fs is no more required. In addition, since the frequency is variable, an excessive current can be prevented and stable storage currents Is . . . can be caused to flow at all times. In addition, no-current time period can be eliminated, so that a voltage equalizing process can be performed efficiently. Due to this, it is desirable to set the length of the predetermined time Tr and the magnitude of the predetermined value Ism so as to obtain those effects.

Furthermore, although the storage currents Is . . . flow to the primary windings 2*a* . . . , when the respective switching elements 3 . . . are switched on, since the storage currents Is . . . become least immediately after the switching elements 3 . . . have been switched on, a voltage drop by the primary diodes 5*a* . . . can be ignored. Then, the control circuit 7 starts the ON control of the switch element 51*a* in the voltage detection circuit 11 at a timing when a predetermined time Td, which is set in advance, has elapsed since the switching elements 3 . . . were switched on and performs a process in which a maximum terminal voltage Vmax is detected by the maximum voltage detection unit 11*m*. Namely, the switching element 51*a* is ON controlled only when the maximum terminal voltage Vmax is detected, whereby since an error that would be generated by the voltage drops by the primary diodes 5*a* . . . can be ignored and the maximum terminal voltage Vmax can be detected at a constant detection timing at all times, a maximum terminal voltage Vmax which is free from variation and is accurate can be detected.

On the other hand, although emission currents Ir . . . flow to the secondary windings 2*b* . . . , when the respective switching elements 3 . . . are switched off, since the emission currents Ir . . . become least immediately before they become zero, a voltage drop by the secondary diodes 5*b* . . . can be ignored. Then, the control circuit 7 monitors the magnitude of the emission currents Ir . . . after the switching elements 3 . . . have been switched off and starts the ON control of the switching element 51*b* in the voltage detection circuit 11 at a timing (a point ts in FIG. 5B) when a predetermined threshold Irs has been reached, a process being carried out in which a maximum terminal voltage Vmin is detected by the minimum voltage detection unit 11*s*. Namely, the switching element 51*b* is ON controlled only when the maximum terminal voltage Vmin is detected, whereby since not only can an error by the voltage drop by the secondary diodes 5*b* . . . be ignored, but also the minimum terminal voltage Vmin can be detected at a constant detection timing at all times, a minimum terminal voltage Vmin which is free from variation and is accurate can be detected. Note that the detection of maximum terminal voltage Vmax and minimum terminal voltage Vmin at the set detection timings can equally be implemented even when a pulse oscillator is used which oscillates a stationary switching frequency (ON/OFF frequency) fs.

In addition, the detection of a minimum terminal voltage Vmin can also be carried out in the following manner. Namely, the minimum voltage detection unit 11*s* obtains in advance through an operation a predetermined time Ts that is spent the magnitude of emission currents Ir . . . generated in association with the emission of energy from the transformer 2 decreases to a predetermined threshold Irs and can detect a minimum terminal voltage Vmin at a timing when the predetermined time Ts has elapsed since the switching elements 3 . . . were switched off. This obviates the necessity of detection of emission currents Ir . . . , thereby making it possible to attempt to simplify the detection processing system.

Third Embodiment

Figure 8:
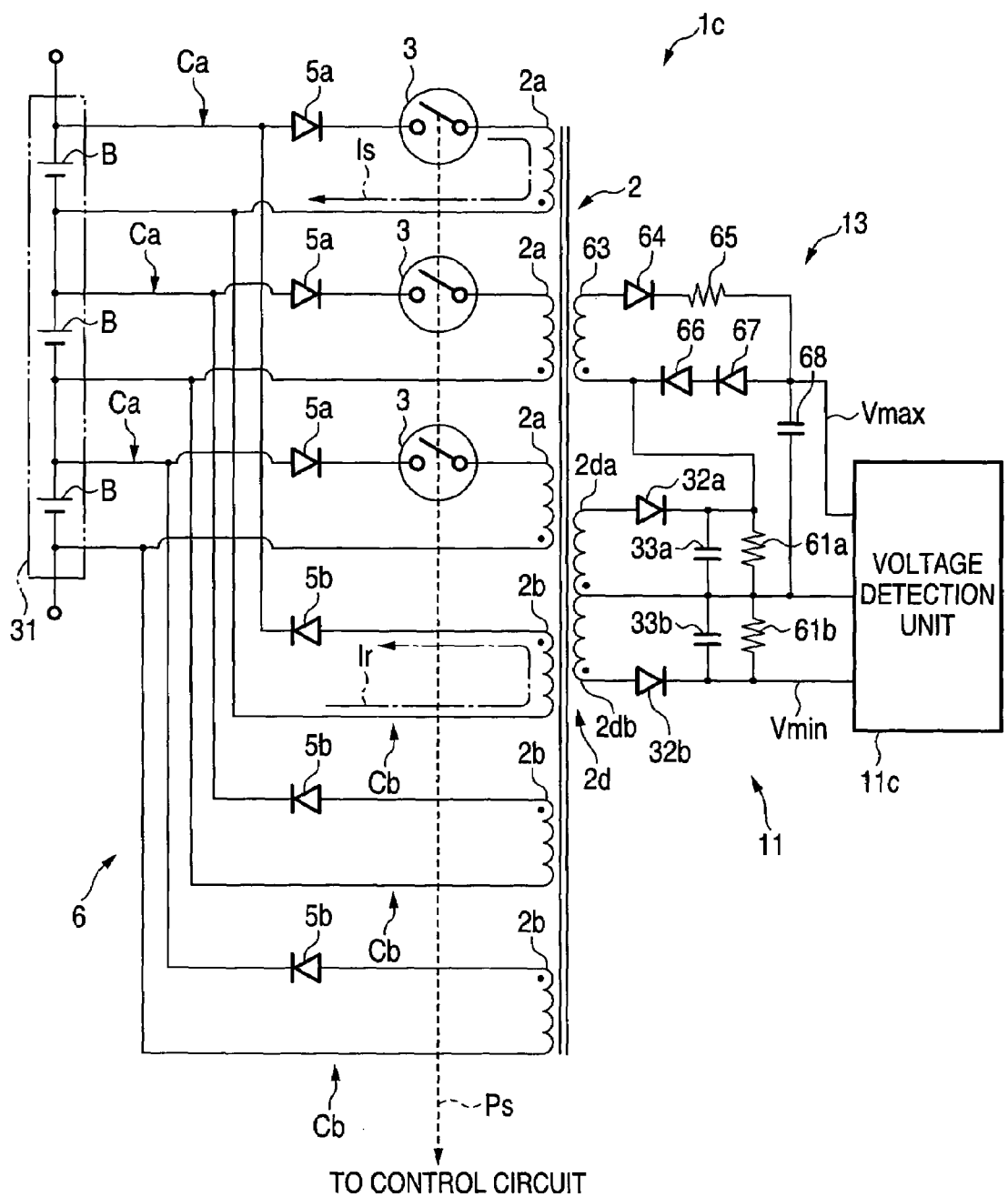
FIG. 8 is a circuit diagram of a voltage equalizer according to a third embodiment of the invention.

Next, referring to FIG. 8, a voltage equalizer 1*c* according to a third embodiment will be described. This voltage equalizer 1*c* differs from the voltage equalizer 1*a* of the first embodiment in that primary windings 2*a* . . . and secondary windings 2*b* . . . are made up of windings which are completely separated, that a winding having a center tap is used for a separate winding 2*d* provided in a voltage detection circuit 11, and that a correction circuit 13 is provided. In this case, the voltage detection circuit 11 utilizes the separate detection winding 2*d* shown in FIG. 7, the maximum voltage holding circuit 12*m* and the minimum voltage holding circuit 12*s* which are shown in FIG. 1 are combined, and a correction circuit 13 is provided for correcting a voltage detected from the terminal voltage of the detection winding 2*d*. The correction circuit 13 is such as to construct a closed circuit by connecting a diode 64, a resistor 65 and diodes 66 and 67 in series to a correction winding 63. By this configuration, since a correction voltage corresponding to a voltage drop by diodes 5*a* . . . is generated at both ends of the diodes 66 and 67, this correction voltage is added to a maximum terminal voltage Vmax which is detected as an end-to-end voltage of a voltage holding capacitor 33*a* so as to correct the maximum terminal voltage Vmax so detected, thereby making it possible to obtain a maximum terminal voltage Vmax which excludes an error due to the voltage drop by the diodes 5*a* . . . . In addition, reference numeral 68 denotes a capacitor, and reference numerals 61*a*, 61*b* denote, respectively, resistors which are connected in parallel to the voltage holding capacitors 33*a*, 33*b*. While the embodiment is described as the maximum terminal voltage Vmax being corrected, a correction circuit for correcting a minimum terminal voltage can equally be provided. Alternatively, a similar correction to the correction implemented by the correction circuit 13 may be implemented using a digital processing function performed in a voltage detection unit 11*c*. Note that both the maximum voltage detection unit 11*m* and the minimum voltage detection unit 11*s* are contained in the voltage detection unit 11*c*. In addition, in FIG. 8, a path along which storage current Ir flows when switching elements 3 . . . are switched off is shown by an arrow followed by a chain line, and a path along which emission current Ir flows when the switching elements 3 . . . are switched off is shown by an arrow followed by a chain line. Since the basic configuration of the voltage equalizer 1c becomes identical with that of the voltage equalizer 1a of the first embodiment, the basic operations of an equalization processing circuit 6 and a voltage detection circuit 11 in the voltage equalizer 1c become also identical with those of the voltage equalizer 1a of the first embodiment. Note that additionally, in FIG. 8, like reference numerals are imparted to like portions to those in FIGS. 1 and 7 so as not only to make clear the configuration in FIG. 8 but also to omit a detailed description thereof.

Fourth Embodiment

Figure 9:
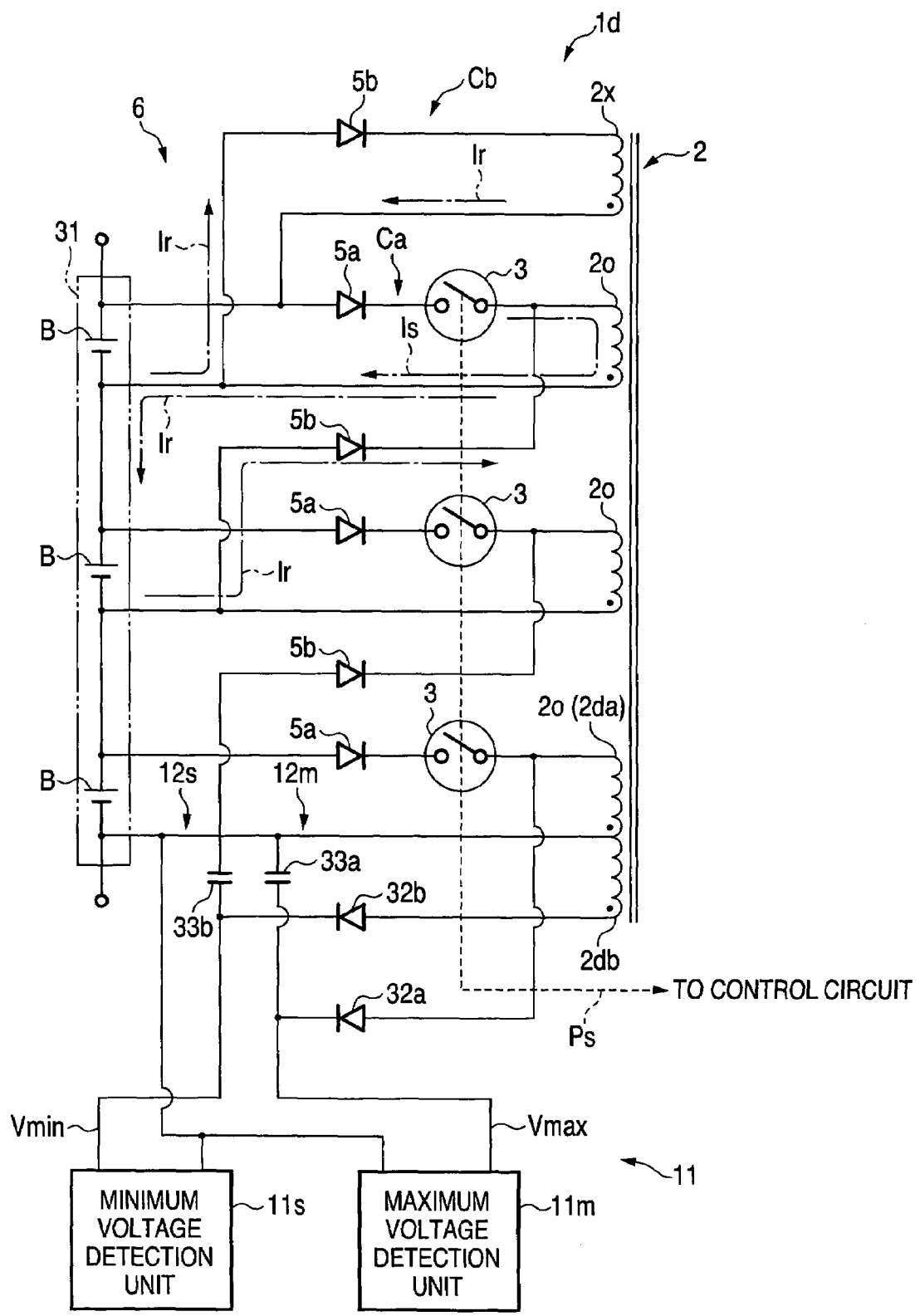
FIG. 9 is a circuit diagram of a voltage equalizer according to a fourth embodiment of the invention.

Next, referring to FIG. 9, a voltage equalizer 1d according to a fourth embodiment will be described below. This voltage equalizer 1d differs from the voltage equalizer 1a of the first embodiment in that basic windings 2o . . . are made up of single windings and are used both for primary series circuits Ca . . . in corresponding battery elements B . . . and secondary series circuits Cb . . . in other battery elements B . . . , and that an auxiliary winding 2x is provided in a transformer 2, so that the auxiliary winding 2x so provided is used as a secondary series circuit Cb in the battery element B in which a secondary series circuit Cb is not configured depending on the basic winding 2o. A secondary winding 2db in FIG. 9 is intended to detect a minimum terminal voltage Vmin. By this configuration, when switching elements 3 . . . are switched on, storage currents Is . . . flow along a path indicated by an arrow followed by a chain line in FIG. 9, whereas, when the switching elements 3 . . . are switched off, emission currents Ir . . . flow along paths indicated by arrows followed by chain lines in FIG. 9. by using the voltage equalizer 1d configured as has been described above, while the auxiliary winding 2x needs to be added, there is provided an advantage that the basic windings 2o . . . can be made up of the single winding of which the number of turns is identical with that of the aforesaid primary winding 2a (or the secondary winding 2b). Note that additionally, in FIG. 9, like reference numerals are imparted to like portions to those shown in FIG. 1 so as not only to make clear the configuration shown in FIG. 9 but also to omit a detailed description thereof.

Fifth Embodiment

Figure 10:
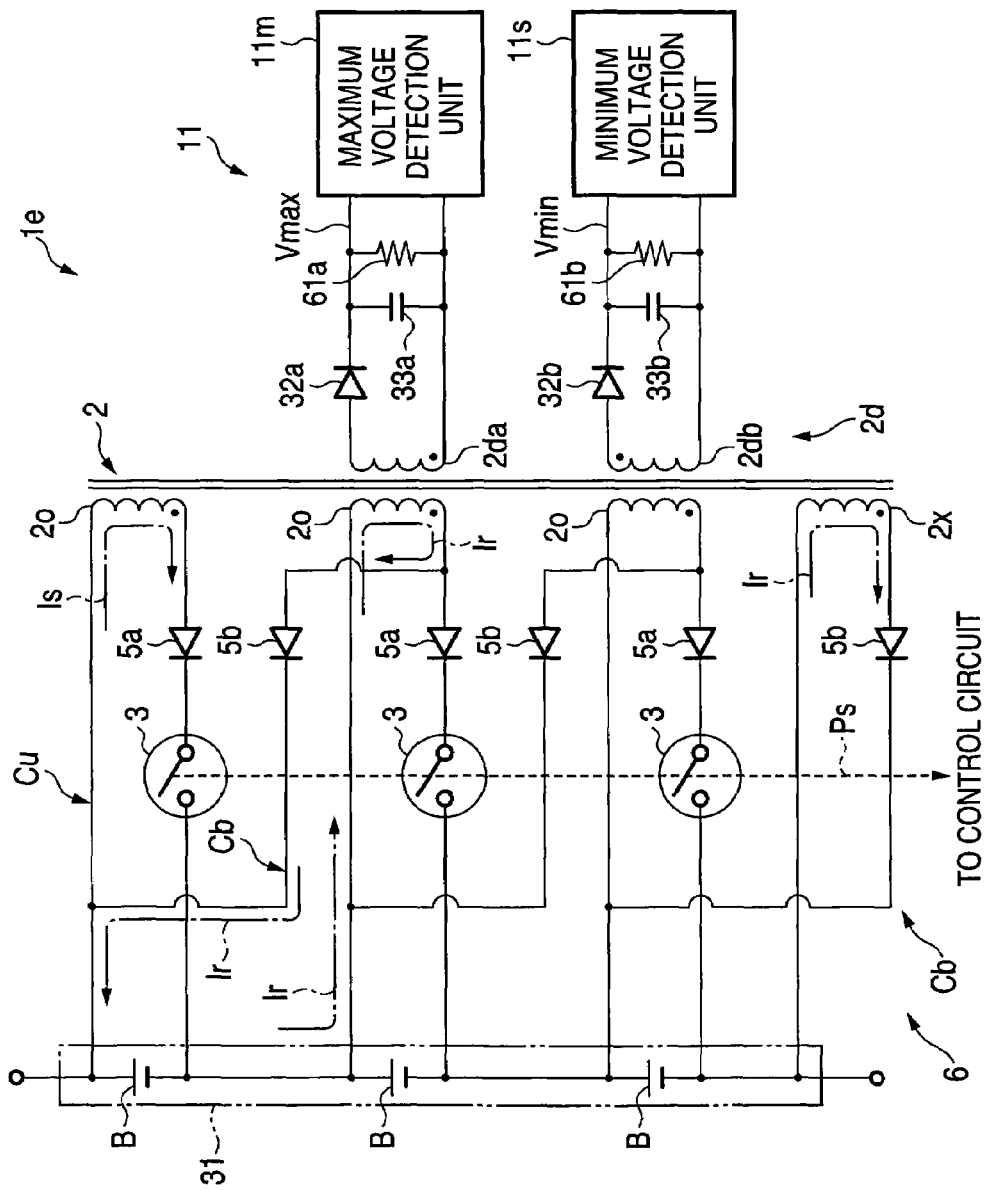
FIG. 10 is a circuit diagram of a voltage equalizer according to a fifth embodiment of the invention.

Next, referring to FIG. 10, a voltage equalizer 1e according to a fifth embodiment of the invention will be described below. This voltage equalizer 1e is a modification made to the voltage equalizer 1d of the fourth embodiment and differs from the voltage equalizer 1d in that locations where respective components are connected are modified and that a detection winding 2d is made up of a separate winding. Consequently, the secondary winding 2db for detecting the minimum terminal voltage Vmin shown in FIG. 9 can be eliminated, whereby, when switching elements 3 . . . are switched on, storage currents Is . . . flow along a path indicated by an arrow followed by a chain line in FIG. 10, whereas, when the switching elements 3 . . . are switched off, emission currents Ir . . . flow along paths indicated by arrows followed by chain lines in FIG. 10. As with the voltage equalizer 1d of the fourth embodiment, while the voltage equalizer 1e requires one auxiliary winding 2x, there can be provided an advantage that basic windings 2o . . . can be made up of a single winding of which the number of turns is identical with that of the aforesaid primary winding 2a (of the secondary winding 2b). Note that additionally, in FIG. 10, like reference numerals are imparted to like portions to those shown in FIGS. 8 and 9 so as not only to make clear the configuration shown in FIG. 10 but also to omit a detailed description thereof.

Sixth Embodiment

Figure 11:
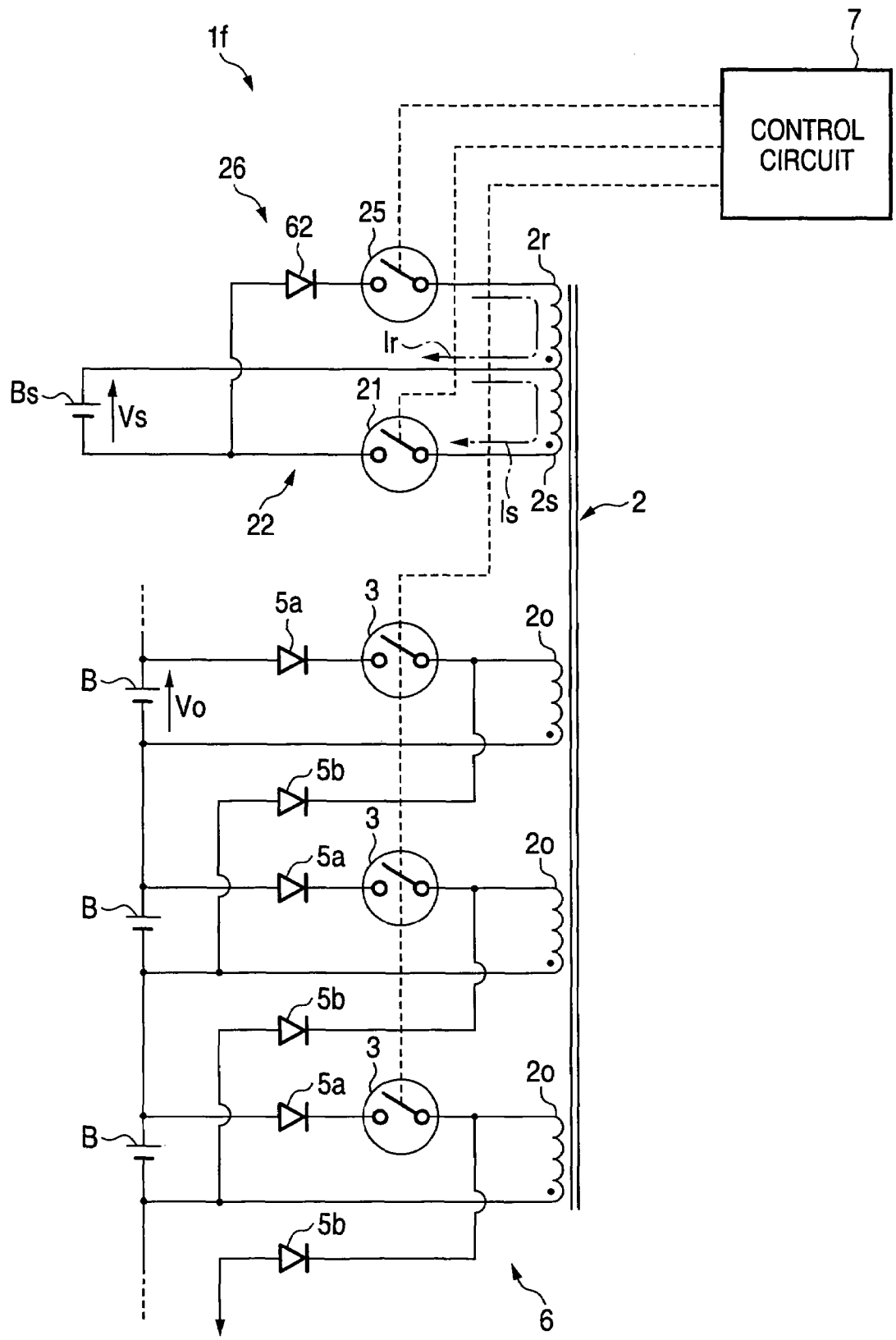
FIG. 11 is a circuit diagram of a voltage equalizer according to a sixth embodiment of the invention.

Next, referring to FIG. 11, a voltage equalizer 1f according to a sixth embodiment will be described below. This voltage equalizer if differs from the voltage equalizer 1d according to the fourth embodiment in that an energy replenishment circuit 22 and an energy discharge circuit 26 are provided. Namely, the voltage equalizer if includes the energy replenishment circuit 22 which configures a closed circuit by connecting in series a replenishment winding 2s provided in a transformer 2 for replenishing energy, a battery unit Bs for replenishing the replenishment winding 2s with energy and a replenishment switching unit 21. In this case, assuming that a maximum terminal voltage of battery elements B . . . is Vomax, the number of turns of a basic winding 2o is No, a terminal voltage of the battery unit Bs is Vs, and the number of turns of the replenishment winding 2s is Ns, Vs and/or Ns is set so as to meet a condition for (Vs/Ns)>(Vomax/No). In addition, a control circuit 7 is provided for ON/OFF controlling switching elements 3 . . . and the replenishment switching unit 21 while causing them to synchronize with each other or ON/OFF controlling the replenishment switching unit 21 with all of the switching elements 3 . . . being OFF controlled. Note that while being omitted from the figure, as a voltage detection circuit 11, the voltage detection circuit 11 shown in FIG. 10 can be provided.

By this configuration, in the event that the switching elements 3 . . . and the replenishment switching unit 21 are synchronized with each other so as to be ON/OFF controlled (or the replenishment switching unit 21 is ON/OFF controlled with all of the switching elements 3 . . . being OFF controlled), the energy replenishment circuit 22 remains a source from which the maximum terminal voltage Vomax is generated at all times, whereby storage current Is flows along a path indicated by an arrow followed by a chain line. Thus, the battery unit Bs can replenish the battery elements B . . . with energy, whereby an excessive self-discharge in the battery elements B . . . can be avoided.

Furthermore, the voltage equalizer 1f includes the energy discharge circuit 26 which configures a closed circuit by connecting in series a discharge winding 2r provided in the transformer 2 for discharging energy, the battery unit Bs which is charged with energy discharged from the discharge winding 2r, a diode 62 and a discharge switching unit 25. In this case, assuming that a minimum terminal voltage of the battery elements B . . . is Vomin, the number of turns of the basic winding 2o is No, the terminal voltage of the battery unit Bs is Vs and the number of turns of the discharge winding 2r is Nr, Vs and/or Nr is set so as to meet a condition for (Vs/Nr)<(Vomin/No). In addition, the control circuit 7 is provided for ON/OFF controlling the switching elements 3 . . . and the discharge switching unit 25 while causing them to synchronize with each other in a reversed state or ON/OFF controlling the switching elements 3 . . . with the discharge switching unit 25 being ON controlled.

By this configuration, in the event that the switching elements 3 . . . and the discharge switching unit 25 are caused to synchronize with each other in the reverse state so as to be ON/OFF controlled (or the switching elements 3 . . . are ON/OFF controlled with the discharge switching unit 25 being ON controlled), the energy discharge circuit 26 remains a source from which the minimum terminal voltage Vomin is generated at all times, whereby emission currents Ir . . . flow along a path indicated by an arrow followed by a chain line. Thus, the battery unit Bs can be charged with energy of the battery elements B . . . , whereby an excessive charging of the battery elements B . . . can be avoided. Note that additionally, in FIG. 11, like reference numerals are imparted to like portions to those shown in FIG. 9 so as not only to make clear the configuration shown in FIG. 11 but also to omit a detailed description thereof.

Seventh Embodiment

Figure 12:
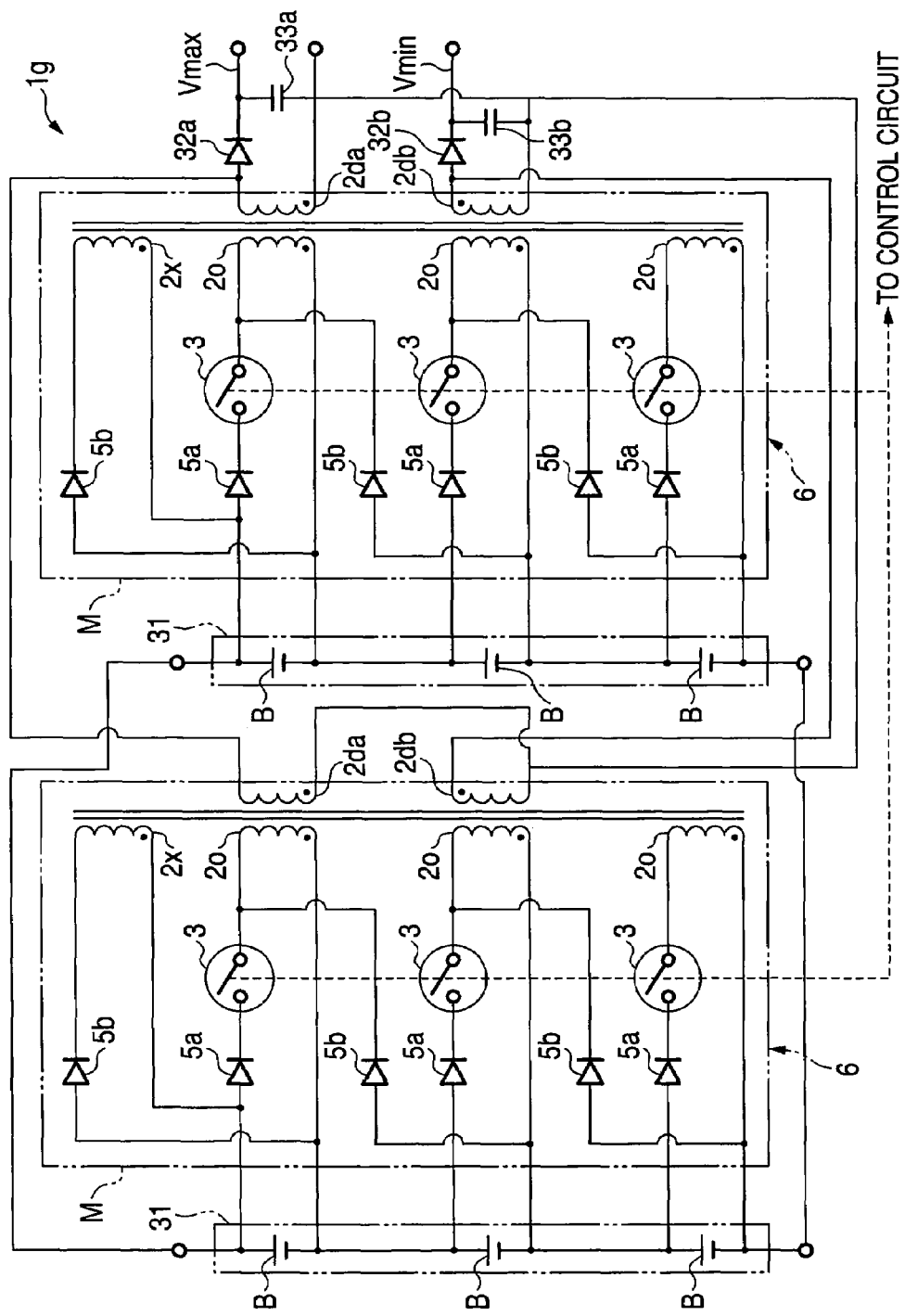
FIG. 12 is a circuit diagram of a voltage equalizer according to a seventh embodiment of the invention.

Next, referring to FIG. 12, a voltage equalizer 1g according to a seventh embodiment of the invention will be described below. In this voltage equalizer 1g, the equalization processing circuit in the voltage equalizer 1d shown in FIG. 9 is configured as a single module M, and a plurality of battery elements B . . . which correspond to a plurality of modules M . . . are connected in parallel to each other. In addition, in the seventh embodiment, a primary winding 2da and a secondary winding 2db which constitute a voltage detection circuit 11 are connected in parallel to each other, and diodes 32a, 32b and voltage holding capacitors 33a, 33b are connected to the modules M . . . in such a manner as to be used equally by the modules M . . . . By configuring the equalization processing circuit 6 as a module, for example, even in the event that the size of a transformer 2 is standardized, it is possible to deal with an arbitrary number of different battery elements B . . . in a proper fashion. Then, the voltage equalization process can be implemented as when the module M is used singly, and the voltage detection by the voltage detection circuit 11 can be implemented. Note that additionally, in FIG. 12, like reference numerals are imparted to like portions to those shown in FIG. 9 so as not only to make clear the configuration shown in FIG. 12 but also to omit a detailed description thereof.

Furthermore, the configuration of the equalization processing circuit into a module as described above can equally be implemented in the aforesaid voltage equalizers 1a, 1b, 1c, 1e, 1f. Consequently, in general, the equalization processing circuit 6 can be configured as a single module which has a transformer 2 having, in turn, a plurality of basic windings 2o . . . which correspond, respectively, to battery elements B . . . , a plurality of switching elements 3 . . . which correspond, respectively, to the battery elements B . . . , and a plurality of sets of primary diodes 5a . . . and secondary diodes 5b to thereby configure a plurality of primary series circuits Ca . . . in which current is carried from the respective battery elements B . . . via the corresponding primary diodes 5a . . . to the respective basic windings 2o . . . when the switching elements 3 . . . are switched on, and a plurality of secondary series circuits Cb . . . in which current is carried from the respective basic windings 2o . . . via the secondary diodes 5b . . . to the respective battery elements B . . . when the switching elements 3 . . . are switched off.

Eighth Embodiment

Figure 13:
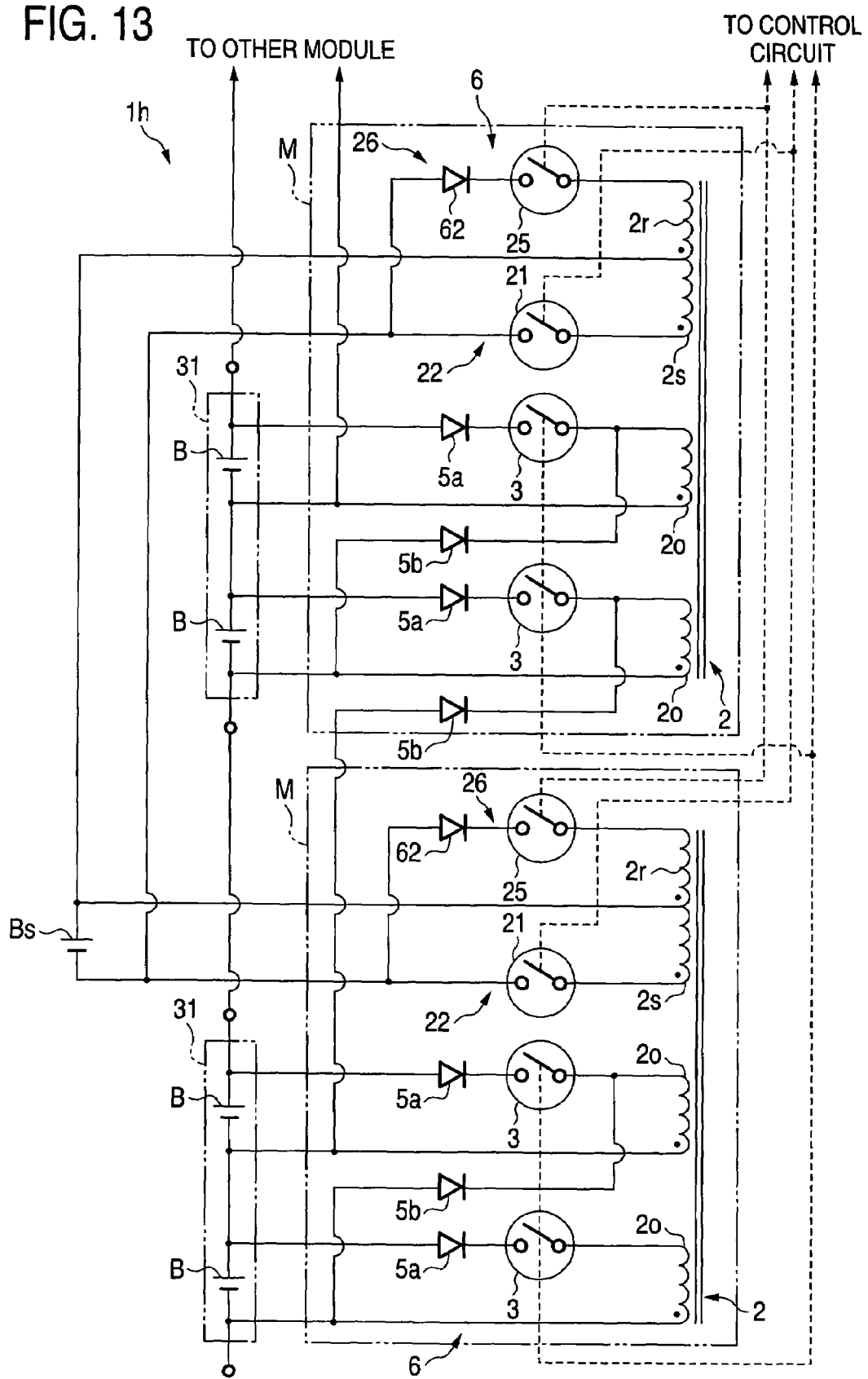
FIG. 13 is a circuit diagram of a voltage equalizer according to an eighth embodiment of the invention.

Next, referring to FIG. 13, a voltage equalizer 1h according to an eighth embodiment of the invention will be described below. In this voltage equalizer 1h, the equalization processing circuit 6 in the voltage equalizer 1f according to the sixth embodiment shown in FIG. 11 is configured as a single module, and a plurality of battery elements B . . . which correspond, respectively, to a plurality of modules M . . . are connected in series to each other. In this case, a common single battery unit Bs can be utilized, and a secondary diode 5b in any module M can be connected to an adjacent following module M. In addition, while a voltage detection circuit 11 is omitted from FIG. 13, a voltage detection circuit 11 can be provided as in the case shown in FIG. 12. Furthermore, even in the event that the equalization processing circuits 6 in the aforesaid voltage equalizers 1a, 1b, 1c, 1d, 1e are used to be configured into such a module M, the module M so configured can equally be applied. Thus, also in the voltage equalizer 1h, as in the case with the voltage equalizer 1g, it is possible to deal with an arbitrary number of different battery elements B . . . in a proper fashion. Then, a voltage equalization process can be implemented as when the module M is used singly, and the voltage detection by the voltage detection circuit 11 can be implemented. Note that additionally, in FIG. 13, like reference numerals are imparted to like portions to those shown in FIG. 11 so as not only to make clear the configuration shown in FIG. 13 but also to omit a detailed description thereof.

Next, referring to FIGS. 14 to 17, voltage equalizers 1i to 1m according to ninth to twelfth embodiments of the invention will be described below. In any of the voltage equalizers 1i to 1m according to the ninth to twelfth embodiments, as a minimum voltage detection unit, a minimum voltage detection unit 11sg (11sga, 11sgb) is provided for detecting a minimum end-to-end voltage of end-to-end voltages of respective groups G . . . of one or two or more groups which result when a plurality of battery elements B . . . are so grouped.

Incidentally, as has been described before, various types of battery elements including ion batteries such as lithium ion batteries and electric double layer capacitors exist for use as the battery element B. In this case, in ion batteries, in the event that the terminal voltage Vo decreases below the normal voltage, an excessive discharge is called for, and this constitutes a cause for the failure of a battery. In the case of capacitors such as electric double layer capacitors, however, even in the event that the terminal voltage Vo decreases below the normal voltage, there is no case where a problem (abnormality) is caused. Consequently, with capacitors such as electric double layer capacitors, it is not necessary to know accurately the minimum terminal voltages Vomin . . . of the individual battery elements B . . . , but it is sufficient to obtain information on whether or not there is occurring a failure, and there is a case where the information itself is not actually needed.

Then, in the voltage equalizers 1i to 1m according to the ninth to twelfth embodiments, as to the detection of minimum terminal voltages Vomin . . . a minimum end-to-end voltage Vxmin of end-to-end terminal voltages of respective groups G . . . of one or two or more groups resulting when a plurality of battery elements B . . . are so grouped is designed to be detected by a minimum voltage detection unit 11sg. Due to this, basic windings 2o . . . are each made up of a plurality of primary windings 2a . . . which correspond, respectively, to battery elements B . . . and one or two or more secondary windings 2b . . . which correspond, respectively, to groups G . . . of one or two or more groups which result when the plurality of battery elements B . . . are so grouped. While minimum terminal voltages of the individual battery elements B . . . cannot be obtained, the minimum end-to-end voltages Vxmin . . . so obtained can be used to anticipate the existence of battery elements B . . . in which something abnormal is being caused and to control the charging and discharging of the whole battery 31.

Ninth Embodiment

Figure 14:
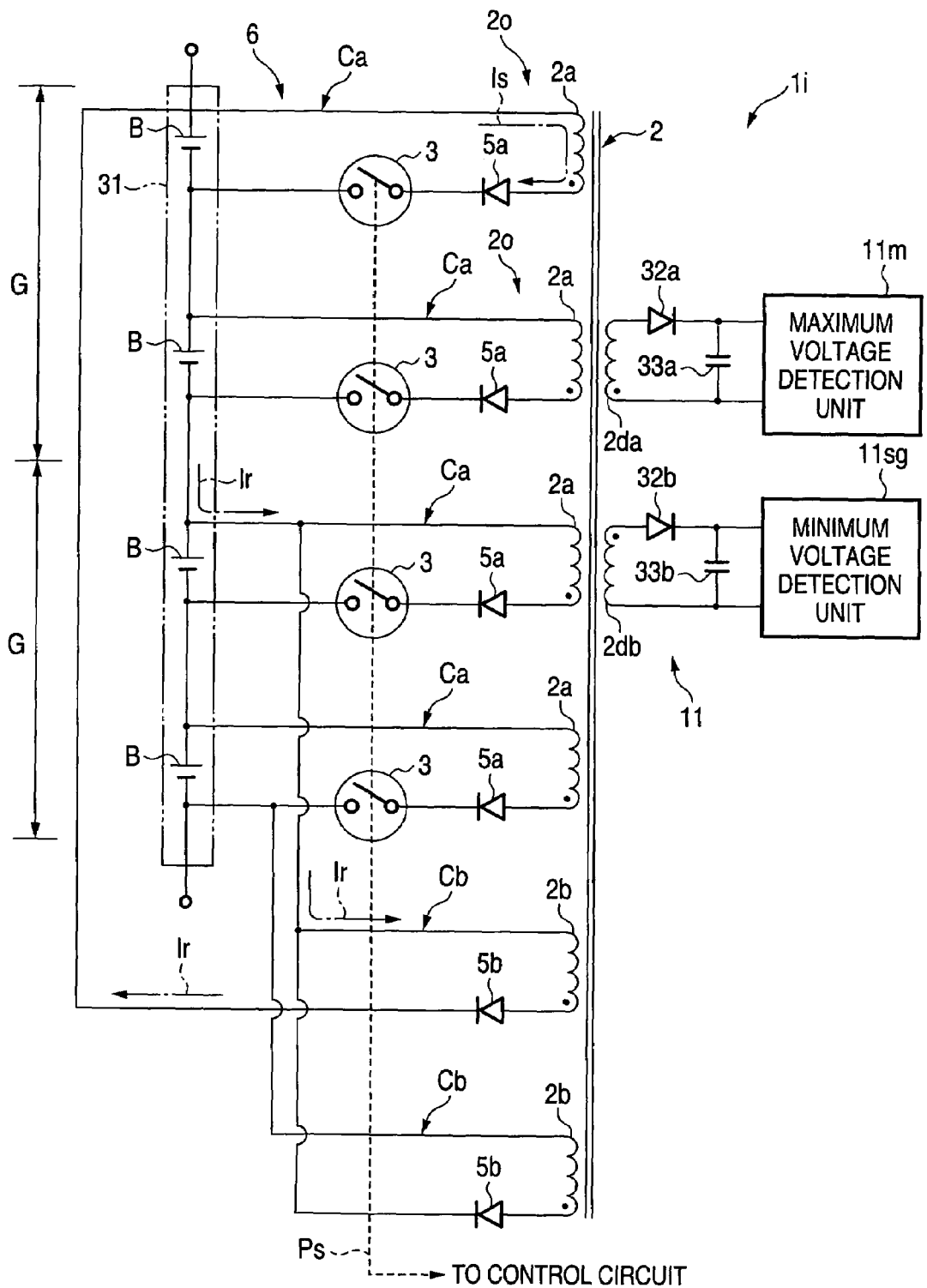
FIG. 14 is a circuit diagram of a voltage equalizer according to a ninth embodiment of the invention.

Firstly, referring to FIG. 14, the voltage equalizer 1*i* according to the ninth embodiment of the invention will be described below. In this voltage equalizer, as an example, there are provided four primary windings 2*a* . . . and two secondary windings 2*b*, which is a half of the primary windings 2*a* . . . Namely, basic windings 2*o* . . . has four primary windings 2*a* . . . which correspond, respectively, to four battery elements B . . . , which are grouped into two groups G . . . of two battery elements, and two secondary windings 2*b* . . . which correspond, respectively, to the groups G . . . . In the case of the voltage equalizer 1*i* according to the ninth embodiment, primary series circuits Ca . . . function in a similar way to that in which those of the voltage equalizer 1*a* according to the first embodiment do. Namely, when respective switching elements 3 . . . are switched on, storage current Is flows along a path indicated by an arrow followed by a chain line in FIG. 14 in association with storage of energy into a transformer 2, whereas, when the switching elements 3 . . . are switched off, emission currents Ir . . . flow along paths indicated by arrows followed by a chain line in FIG. 14 in association with emission of energy in the transformer 2 from the secondary windings 2*b* . . . . As this occurs, since the discharge current Ir which flows from one of the secondary windings 2*b* is supplied to the two battery elements B . . . which are connected in series thereto via a secondary diode 5*b* so as to charge them, a minimum end-to-end voltage Vxmin of end-to-end voltages of the respective groups G . . . which are each made up of the two battery elements B . . . is detected at a minimum voltage detection unit 11*sg*.

Consequently, as has been described above, while the minimum terminal voltage of the individual battery elements B . . . cannot be obtained, by determining Vxmin/2, it is possible to anticipate the existence of the battery elements B . . . in which something abnormal is being caused and to control the charging and discharging of the whole battery 31. In addition, it is possible to attempt to reduce the production costs of, reduce the size of and increase the efficiency of the entire system by simplifying the circuit configuration on the side of the secondary windings 2*b* . . . . Note that in this example, it is possible to obtain a minimum terminal voltage Vmin which can be compared with the aforesaid maximum terminal voltage Vmax by halving the minimum end-to-end voltage Vxmin. This is true with the equalizers 1*j* to 1*m* according to the tenth to twelfth embodiments, which will be described below. Note that additionally, in FIG. 14, like reference numerals are imparted to like portions to those described in FIGS. 8 and 10 so as not only to make clear the configuration shown in FIG. 14 but also to omit a detailed description thereof.

Tenth Embodiment

Figure 15:
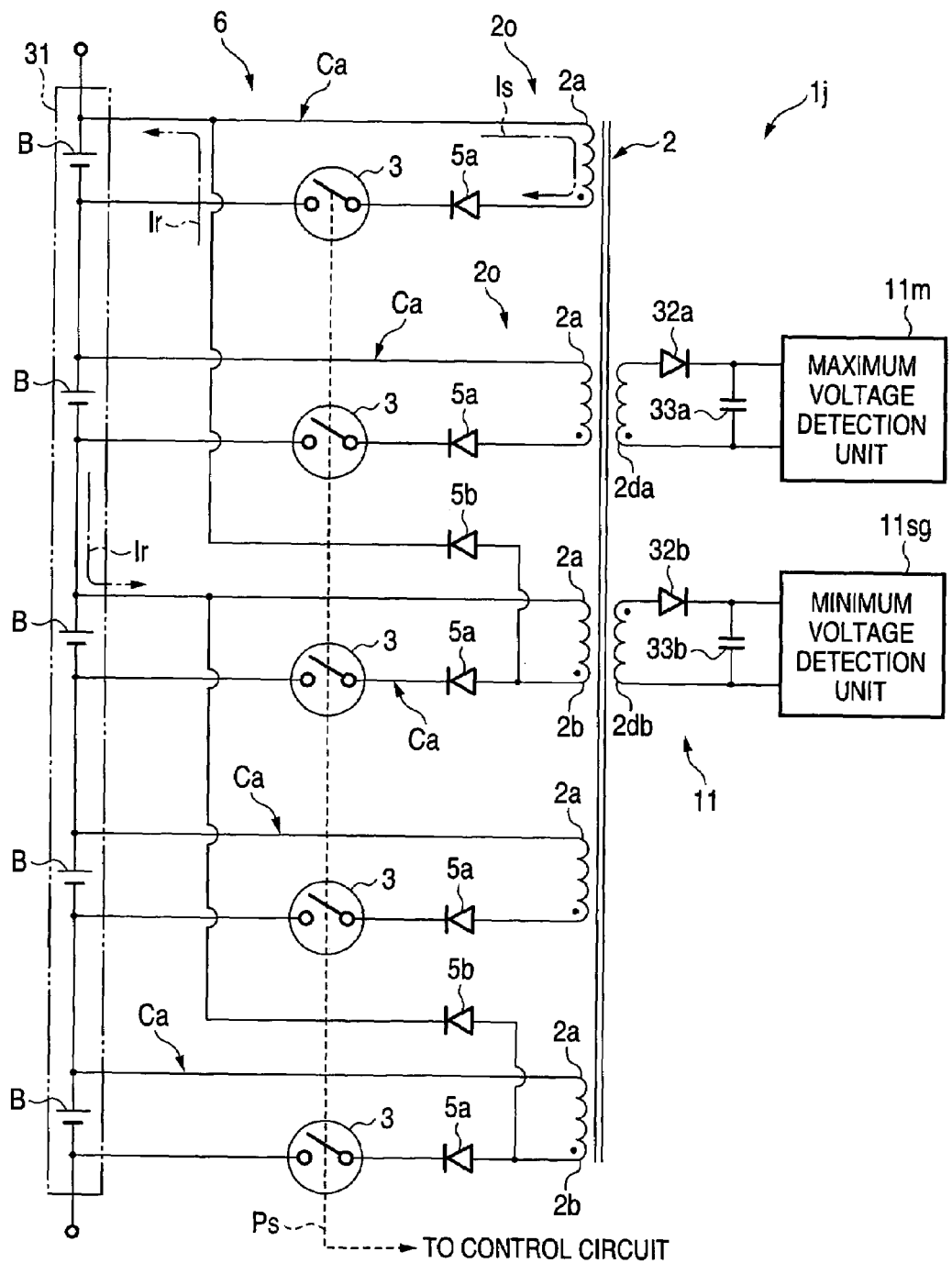
FIG. 15 is a circuit diagram of a voltage equalizer according to a tenth embodiment of the invention.

Next, referring to FIG. 15, the voltage equalizer 1*j* according to the tenth embodiment of the invention will be described below. In this voltage equalizer 1*j*, as an example, five primary windings 2*a* . . . are provided, and two of the five are also used as secondary windings 2*b* . . . In FIG. 15, the two primary windings 2*a* . . . to which secondary diodes 5*b* . . . are connected are also used as the secondary windings 2*b* . . . and two battery elements B . . . constitute a group G. Also, in the case of the voltage equalizer 1*j* according to the tenth embodiment, primary series circuits Ca . . . function in a similar way to that in which those of the voltage equalizer 1*a* according to the first embodiment do. Namely, when respective switching elements 3 . . . are switched on, storage current Is flows along a path indicated by an arrow followed by a chain line in FIG. 15 in association with storage of energy into a transformer 2, whereas, when the switching elements 3 . . . are switched off, emission currents Ir . . . flow along paths indicated by arrows followed by a chain line in FIG. 15 in association with emission of energy in the transformer 2 from the secondary windings 2*b* . . . . As this occurs, since the discharge current Ir which flows from one of the secondary windings 2*b* (the primary windings 2*a*) is supplied to the two battery elements B . . . which are connected in series thereto via the secondary diode 5*b* so as to charge them, a minimum end-to-end voltage Vxmin of end-to-end voltages of the respective groups G . . . which are each made up of the two battery elements B . . . is detected at a minimum voltage detection unit 11*sg*. Consequently, a similar advantage to that obtained by the voltage equalizer 1*i* of the ninth embodiment can be obtained, and in particular, since at least part of the primary windings 2*a* . . . is also used as the secondary windings 2*b* . . . , this arrangement can contribute to a further simplification of the circuit configuration. Note that additionally, in FIG. 15, like reference numerals are imparted to like portions to those shown in FIG. 10 so as not only to make clear the configuration shown in FIG. 15 but also to omit a detailed description thereof.

Eleventh Embodiment

Figure 16:
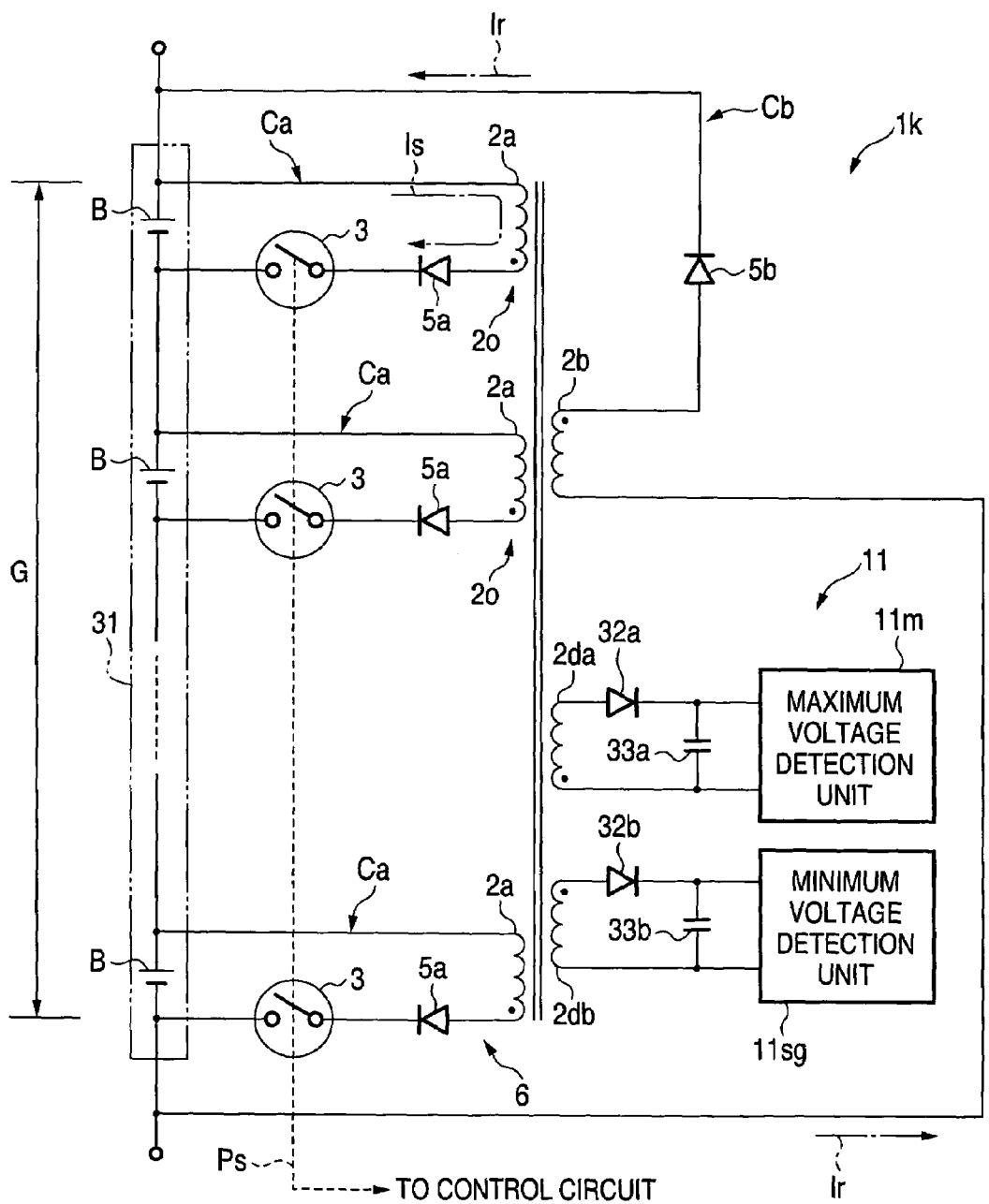
FIG. 16 is a circuit diagram of a voltage equalizer according to an eleventh embodiment of the invention.

Next, referring to FIG. 16, the voltage equalizer 1*k* according to the eleventh embodiment of the invention will be described below. In this voltage equalizer 1*k*, a single secondary winding 2*b* is provided, while a plurality of primary windings 2*a* . . . are provided. Due to this, basic windings 2*o* have a plurality of primary windings 2*a* . . . which correspond, respectively, to battery elements B . . . , and all of the battery elements B . . . are grouped into a single group G. Also, in the case of the voltage equalizer 1*k* according to the eleventh embodiment, primary series circuits Ca . . . function in a similar way to that in which those of the voltage equalizer 1*a* according to the first embodiment do. Namely, when respective switching elements 3 . . . are switched on, storage current Is flows along a path indicated by an arrow followed by a chain line in FIG. 16 in association with storage of energy into a transformer 2, whereas, when the switching elements 3 . . . are switched off, emission currents Ir . . . flow along paths indicated by arrows followed by a chain line in FIG. 16 in association with emission of energy in the transformer 2 from the secondary winding 2*b* . . . As this occurs, the emission current Ir which flows out of the single secondary winding 2*b* is supplied to all of the battery elements B . . . (the entirety of a battery 31) which are connected in series thereto via a second diode 5*b* so as to charge the battery elements. Consequently, a special mode is generated here in which the entire voltage of the battery 31 is detected at a minimum voltage detection unit 11*sg*. Note that a similar advantage to that obtained by the voltage equalizer 1*i* of the ninth embodiment can be obtained with the voltage equalizer 1*k* according to the eleventh embodiment. Also note that additionally, in FIG. 16, like reference numerals are imparted to like portions to those shown in FIG. 14 so as not only to make clear the configuration shown in FIG. 16 but also to omit a detailed description thereof.

Twelfth Embodiment

Figure 17:
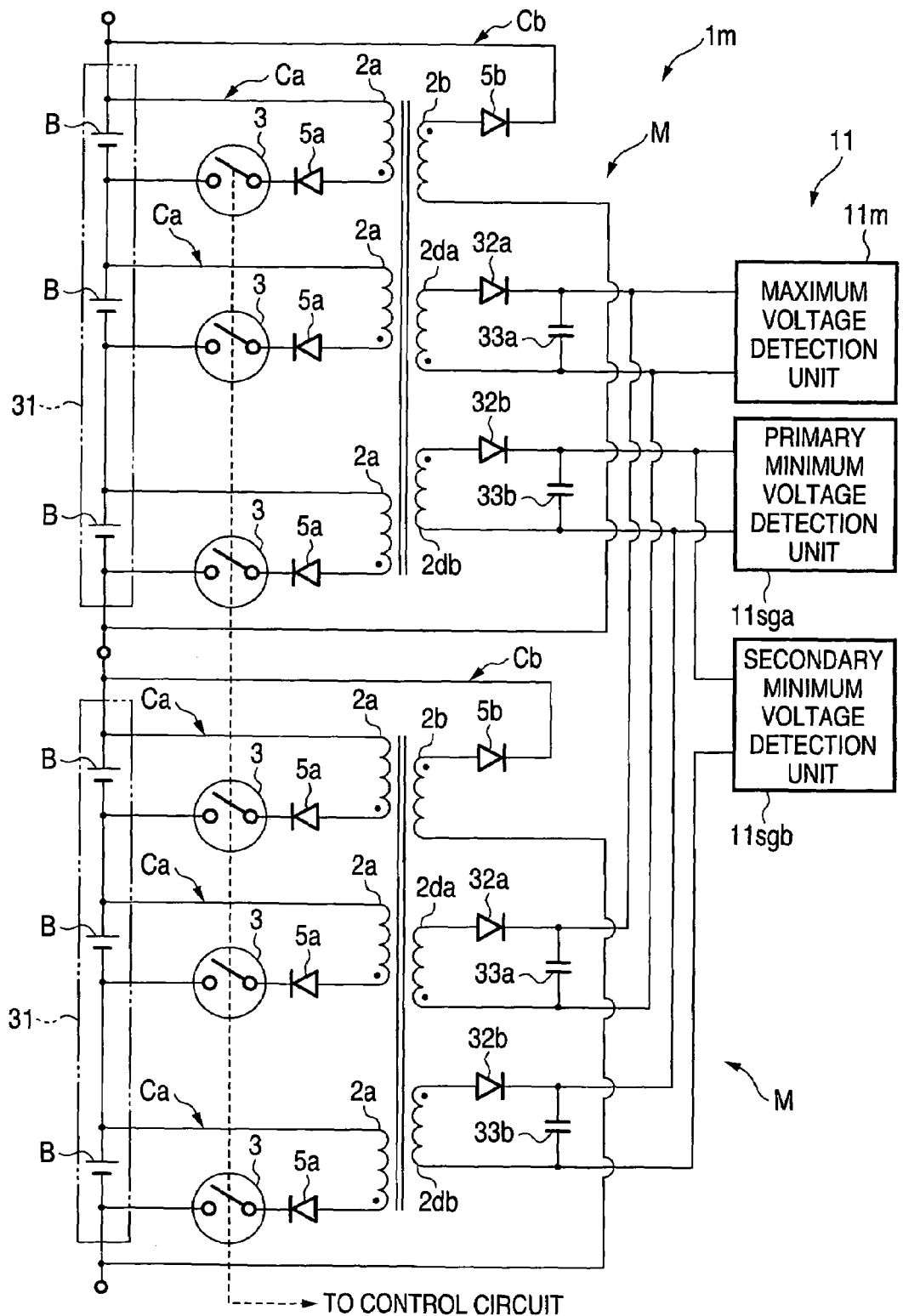
FIG. 17 is a circuit diagram of a voltage equalizer according to a twelfth embodiment of the invention.

Next, referring to FIG. 17, the voltage equalizer 1*m* according to the twelfth embodiment of the invention will be described below. In this voltage equalizer 1*m*, the voltage equalizer 1*k* according to the eleventh embodiment is configured into a single module M, and a plurality of (two in the embodiment) models M . . . are connected in series. Consequently, the function (operation) of each of the modules M . . . becomes identical with that of the voltage equalizer $1k$ according to the eleventh embodiment. In this case, terminal voltages of battery elements B . . . of all the modules M . . . are equalized in a similar way to that in which the terminal voltages of the battery elements are equalized by the voltage equalizer $1k$ in the eleventh, embodiment. In addition, a maximum voltage detection unit $11m$, a minimum voltage detection unit $11sga$ and a secondary minimum voltage detection unit $11sgb$ are connected as shown in FIG. 17, whereby a maximum terminal voltage Vomax of the respective battery elements B . . . in all the modules M . . . can be detected in the maximum voltage detection unit $11m$, the end-to-end voltage of a battery 31 in one (upper one in the figure) of the modules M can be detected by the primary minimum voltage detection unit $11sga$, and the end-to-end voltage of all the modules M . . . which results from the addition of the end-to-end voltage of the upper module M and the end-to-end voltage of the lower module M can be detected by the secondary minimum voltage detection unit $11sgb$. Note that by subtracting the detection result of the primary minimum voltage detection unit $11sga$ from the detection result of the secondary minimum voltage detection unit $11sgb$, the end-to-end voltage of the other module (the lower one in the figure). Note that additionally, in FIG. 17, like reference numerals are imparted to like portions to those shown in FIG. 16 so as not only to make clear the configuration shown in FIG. 17 but also to omit a detailed description thereof.

Thus, while the various types of embodiments have been described in detail, the invention is not limited thereto, and any modification, addition and deletion may be made to those embodiments with respect to the configurations of detailed portions, materials, amounts and numerical values without departing from the spirit and scope of the invention. For example, various types of components and circuits which have the same function can be used for switching elements, diodes, voltage detection circuits and voltage holding circuits. In addition, while the battery elements are described as battery elements for use for a battery that is installed in electric vehicles which are run by motors or hybrid vehicles which are run in combination of an engine and a motor/s, the application of the invention is not limited thereto.

What is claimed is:

1. A voltage equalizer for equalizing terminal voltages of a plurality of battery elements, comprising:
   an equalization processing circuit comprising:
   a transformer including basic windings, the basic windings having a plurality of primary windings and one or more secondary windings, wherein the primary windings respectively correspond to the battery elements;
   a plurality of switching elements respectively corresponding to the battery elements;
   a plurality of primary diodes respectively corresponding to the battery elements and respectively in series with the switching elements;
   one or more secondary diodes corresponding to the secondary windings,
   wherein a plurality of primary series circuits and one or more secondary series circuits are constituted,
   wherein a first primary series circuit carries current from a first battery element to a first primary winding, when a first primary switching element provided in the first primary series circuit is switched on,
   wherein a first secondary series circuit carries current from a first secondary winding to the first batter element, when the first primary switching element provided in the first primary series circuit is switched off,
   wherein the primary series circuits including the first primary series circuit carry current from the battery elements including the first battery element via the respective primary diodes to the respective primary windings including the first primary winding when the switching elements provided in the respective primary series circuits are switched on, and the secondary series circuits including the first secondary series circuit carry current from the respective secondary windings including the first secondary winding via the respective secondary diodes to the battery elements when the switching elements provided in the respective primary series circuits are switched off; and
   a control circuit for ON/OFF controlling the switching elements.

2. The voltage equalizer according to claim 1, wherein the plurality of battery elements are connected in series to each other.

3. The voltage equalizer according to claim 1, wherein each basic winding is separated by an intermediate tap to form one of the primary windings, corresponding to one of the battery elements, and one of the secondary windings.

4. The voltage equalizer according to claim 1, wherein one of the basic windings made up of a single winding and used both for one of the primary series circuits corresponding to one of the battery elements and one of the secondary series circuit corresponding to the other of the battery elements, wherein the transformer further includes an auxiliary winding, and the auxiliary winding is used as a secondary series circuit in the battery elements where any secondary series circuits depending upon the basic windings is not configured.

5. The voltage equalizer according to claim 1, wherein the plurality of battery elements are grouped into one or more groups, and wherein the basic windings are made up of a plurality of primary windings respectively correspond to the battery elements and one or more secondary windings respectively correspond to the groups of the battery element.

6. The voltage equalizer according to claim 5, wherein the secondary windings utilize at least part of the plurality of primary windings.

7. The voltage equalizer according to claim 1, further comprising a voltage detection unit for detecting a maximum terminal voltage and/or a minimum terminal voltage of the plurality of battery elements from one of the terminal voltages of the basic windings or a terminal voltage of a detection winding which is separately provided in the transformer.

8. The voltage equalizer according to claim 7, wherein the plurality of battery elements are grouped into one or more groups, and wherein the minimum terminal voltage includes a minimum end-to-end voltage of end-to-end voltages of the groups.

9. The voltage equalizer according to claim 7, wherein the voltage detection circuit comprises a correction circuit for correcting a voltage detected from the terminal voltages of the basic windings or the terminal voltage of the detection winding.

10. The voltage equalizer according to claim 7, wherein the voltage detection circuit comprises at least one of a maximum voltage holding circuit for holding the maximum terminal voltage and a minimum voltage holding circuit for holding the minimum terminal voltage.

11. The voltage equalizer according to claim 7, wherein the voltage detection circuit comprises a maximum voltage detection unit for detecting the maximum terminal voltage immediately after the switching elements are switched on.

12. The voltage equalizer according to claim 7, wherein the voltage detection circuit comprises a minimum voltage detection unit for detecting a minimum terminal voltage immediately before an emission current generated in association with emission of energy from the transformer becomes zero after the switching elements are switched off.

13. The voltage equalizer according to claim 12, wherein the minimum voltage detection unit detects the emission current and detects the minimum terminal voltage at a timing when the magnitude of the emission current has reached a predetermined threshold.

14. The voltage equalizer according to claim 13, further comprising a control circuit for detecting an emission current generated in association with emission of energy from the transformer after the switching elements is switched off, ON controlling the switching elements at a predetermined timing after the emission current became zero, detecting a storage current generated in association with storage of energy into the transformer after the switching elements is switched on, and OFF controlling the switching elements at a timing when the magnitude of the storage current reaches a predetermined value.

15. The voltage equalizer according to claim 12, wherein the minimum voltage detection unit obtains in advance through an operation of a predetermined time period that is spent until the magnitude of an emission current generated in association with emission of energy from the transformer decreases to a predetermined threshold, and wherein the minimum voltage detection unit detects the minimum terminal voltage at a timing when the predetermined time period has elapsed after the switching elements were switched off.

16. The voltage equalizer according to claim 7, wherein the control circuit obtains a differential voltage between the maximum terminal voltage detected by the voltage detection circuit and the minimum terminal voltage that can be compared with the maximum terminal voltage, and wherein the ON/OFF control of the switching elements is stopped so as to be put in an OFF state when the differential voltage is equal to or lower than a set value set in advance.

17. The voltage equalizer according to claim 7, wherein the control circuit obtains a differential voltage between the maximum terminal voltage detected by the voltage detection circuit and the minimum terminal voltage that can be compared with the maximum terminal voltage, and wherein a switching frequency for ON/OFF controlling the switching elements is set to be low when the differential voltage is large, whereas the switching frequency is set to be high when the differential voltage is small.

18. The voltage equalizer according to claim 1, further comprising an energy replenishment circuit that configures a closed circuit by connecting in series a replenishment winding provided in the transformer for replenishment of energy, a battery unit for replenishing the replenishment winding with energy and a replenishment switching unit, wherein, assuming that a maximum terminal voltage of the battery elements is Vomax, the number of turns of the basic windings is No, the terminal voltage of the battery unit is Vs and the number of turns of the replenishment winding is Ns, Vs and/or Ns is set so as to meet a condition for (Vs/Ns)>(Vomax/No).

19. The voltage equalizer according to claim 18, wherein the control circuit ON/OFF controls the switching elements and the replenishment switching unit to synchronize with each other.

20. The voltage equalizer according to claim 18, wherein the control circuit ON/OFF controls the replenishment switching unit with all of the switching elements being OFF controlled.

21. The voltage equalizer according to claim 1, further comprising an energy discharge circuit which configures a closed circuit by connecting in series a discharge winding provided in the transformer for discharge of energy, a battery unit adapted to be charged with energy discharged from the discharge winding and a discharge switching unit, wherein, assuming that the minimum terminal voltage of the battery elements is Vomin, the number of turns of the basic windings is No, the terminal voltage of the battery unit is Vs, and the number of turns of the discharge winding is Nr, Vs and/or Nr is set so as to meet a condition for (Vs/Nr)<(Vomin/No).

22. The voltage equalizer according to claim 21, wherein the control circuit ON/OFF controls the switching elements and the discharge switching unit so t hat the switching elements and the discharge switching unit to synchronize with each other in a reverse state.

23. The voltage equalizer according to claim 21, wherein the control circuit ON/OFF controls the switching elements with the discharge switching unit being ON controlled.

24. The voltage equalizer according to claim 1, wherein the equalization processing circuit is configured as a single module, and wherein a plurality of battery elements respectively correspond to a plurality of modules are connected in parallel or in series to each other.

* * * * *